United States Patent
Maier et al.

(10) Patent No.: US 12,194,630 B2
(45) Date of Patent: Jan. 14, 2025

(54) INDUSTRIAL ROBOT SYSTEM AND METHOD FOR CONTROLLING AN INDUSTRIAL ROBOT

(71) Applicant: Beckhoff Automation GmbH, Verl (DE)

(72) Inventors: Clemens Maier, Bludenz (AT); Armin Pehlivan, Nüziders (AT); Christoph Zech, Vienna (AT); Peter Kastler, Vienna (AT); Thomas Morscher, Vienna (AT)

(73) Assignee: Beckhoff Automation GmbH, Verl (DE)

( * ) Notice: Subject to any disclaimer, the term of this patent is extended or adjusted under 35 U.S.C. 154(b) by 381 days.

(21) Appl. No.: 16/786,636

(22) Filed: Feb. 10, 2020

(65) Prior Publication Data

US 2020/0254610 A1 Aug. 13, 2020

(30) Foreign Application Priority Data

Feb. 11, 2019 (DE) ..................... 10 2019 103 349.7

(51) Int. Cl.
*B25J 9/16* (2006.01)
*B25J 13/08* (2006.01)
(Continued)

(52) U.S. Cl.
CPC ........... *B25J 9/1605* (2013.01); *B25J 9/1653* (2013.01); *B25J 9/1664* (2013.01); *B25J 9/1679* (2013.01);
(Continued)

(58) Field of Classification Search
CPC ...... B25J 9/1605; B25J 9/1653; B25J 9/1664; B25J 9/1679; B25J 9/1694; B25J 13/08;
(Continued)

(56) References Cited

U.S. PATENT DOCUMENTS 4,785,399 A * 11/1988 Evans .................. B29C 64/129
715/810
5,347,459 A * 9/1994 Greenspan ............... B25J 19/06
700/255
(Continued)

FOREIGN PATENT DOCUMENTS

DE 102006048166 A1 2/2008
DE 102012110508 A1 5/2013
(Continued)

OTHER PUBLICATIONS

Exam Report with machine translation for German Application No. 102019103349.7, issued Oct. 18, 2019, 16 pages.
(Continued)

*Primary Examiner* — Abby Y Lin
*Assistant Examiner* — Dylan M Katz
(74) *Attorney, Agent, or Firm* — Dorsey & Whitney LLP

(57) ABSTRACT

A method for controlling an industrial robot provides that position data of the industrial robot are detected and environment data of an object in an environment of the industrial robot are captured with an environment detection unit. The position data and the environment data are transformed into a common figure space, in which a control figure is defined for the industrial robot and an object figure of the object is represented. A parameter set is created which takes a dimensioning of the control figure in the figure space into account. The parameter set comprises a temporal and spatial correlation of the position data and the environment data and takes into account the movement history of the industrial robot and/or of the object. An action instruction is generated for the industrial robot if the control figure and the object figure satisfy a predefined criterion in relation to each other.

24 Claims, 8 Drawing Sheets

(51) Int. Cl.
*B25J 19/02* (2006.01)
*B25J 19/04* (2006.01)

(52) U.S. Cl.
CPC ............ *B25J 9/1694* (2013.01); *B25J 13/08* (2013.01); *B25J 19/022* (2013.01); *B25J 19/04* (2013.01)

(58) Field of Classification Search
CPC ........ B25J 19/022; B25J 19/04; B25J 9/1676; B25J 9/1666; B25J 9/1671; B25J 9/1682; G05B 2219/39091; G05B 2219/40202; G05B 2219/40203; G05B 2219/40475; G05B 2219/35148; G05B 2219/40438; G05B 2219/40446; G05B 2219/40512
See application file for complete search history.

(56) References Cited

U.S. PATENT DOCUMENTS

| | | | | |
|---|---|---|---|---|
| 9,623,560 | B1* | 4/2017 | Theobald | B25J 9/1676 |
| 10,303,180 | B1* | 5/2019 | Prats | G05D 1/0212 |
| 11,016,491 | B1* | 5/2021 | Millard | G05D 1/0274 |
| 2003/0225479 | A1* | 12/2003 | Waled | B25J 9/161 |
| | | | | 700/245 |
| 2012/0182419 | A1* | 7/2012 | Wietfeld | G06T 7/13 |
| | | | | 348/137 |
| 2013/0178980 | A1* | 7/2013 | Chemouny | B25J 9/1671 |
| | | | | 700/255 |
| 2014/0200863 | A1* | 7/2014 | Kamat | E02F 9/245 |
| | | | | 703/1 |
| 2015/0217455 | A1* | 8/2015 | Kikkeri | G06T 7/20 |
| | | | | 700/259 |
| 2015/0328776 | A1* | 11/2015 | Shiratsuchi | B25J 9/1676 |
| | | | | 901/49 |
| 2016/0016315 | A1* | 1/2016 | Kuffner, Jr. | B25J 19/06 |
| | | | | 901/49 |
| 2016/0207198 | A1* | 7/2016 | Willför | B25J 9/1676 |
| 2018/0297204 | A1* | 10/2018 | Krasny | B25J 9/163 |
| 2019/0176326 | A1* | 6/2019 | Bingham | B25J 9/161 |
| 2019/0221037 | A1* | 7/2019 | Sugaya | G05B 19/4069 |
| 2019/0240835 | A1* | 8/2019 | Sorin | B25J 9/1671 |
| 2019/0321975 | A1* | 10/2019 | Dirschlmayr | B25J 9/1605 |
| 2020/0086486 | A1* | 3/2020 | Graichen | B25J 9/1666 |
| 2020/0206928 | A1* | 7/2020 | Denenberg | G01S 7/4808 |
| 2021/0178591 | A1* | 6/2021 | Floyd-Jones | B25J 9/1666 |

FOREIGN PATENT DOCUMENTS

| | | |
|---|---|---|
| DE | 102013110905 A1 | 4/2015 |
| DE | 102015011830 A1 | 3/2016 |
| DE | 102016123945 A1 | 6/2017 |
| EP | 2838695 B1 | 5/2016 |
| JP | 2013129018 A | 7/2013 |
| WO | 2011051285 A1 | 5/2011 |
| WO | 2016209583 A1 | 12/2016 |

OTHER PUBLICATIONS

Springer Handbook of Robotics, ISBN 978-3-319-32550-7, 2016.
Hermann, et al., "GPU-based Real-Time Collision Detection for Motion Execution in Mobile Manipulation Planning", IEEE, 16th International Conference on Advanced Robotics (ICAR), Nov. 25, 2013, 7 pages,].

* cited by examiner

INDUSTRIAL ROBOT SYSTEM AND METHOD FOR CONTROLLING AN INDUSTRIAL ROBOT

CROSS REFERENCE TO RELATED APPLICATIONS

This application claims priority to German patent application DE 10 2019 103 349.7, filed 11 Feb. 2019, entitled INDUSTRIEROBOTERSYSTEM UND VERFAHREN ZUR STEUERUNG EINES INDUSTRIEROBOTERS, which is incorporated by reference herein, in the entirety and for all purposes.

FIELD

The present invention relates to an industrial robot system and a method for controlling an industrial robot.

BACKGROUND

The use of industrial robots is now an essential feature in many areas of industrial production and manufacturing and in automation technology. An enormous increase in the number of deployed systems is also forecast for the next few years and decades. An industrial robot refers to a programmable machine that can have multiple movable axes and using tools, grippers or other manufacturing means, can perform handling and/or manufacturing tasks in automation technology. An industrial robot which works together with human beings and is not separated from them by protective devices in the production and manufacturing process is also called a collaborative robot, or Cobot for short. In the following, in place of the term Cobot the term industrial robot is used, however.

Due to the close cooperation of the industrial robot with human beings, an industrial robot must be able to detect people and act accordingly in dangerous situations. Modern industrial robots usually detect people exclusively by the measurement of torques or force sensors. This means, however, that the industrial robot can only detect collisions with people once an actual collision has occurred. At no time prior to this can the industrial robot assess whether or not there is a computable probability of a collision occurring with a human.

To improve the safety of a person cooperating with an industrial robot in industrial production and manufacturing and to avoid collisions, an additional camera system can be installed. An example of such a camera system is described in DE 10 2006 048 166 A1. For the camera-based detection and modeling of persons the data which a multi-camera system has identified from the environment of the industrial robot are compared with known personal data, and in the event of a match a virtual image of the person is generated. The virtual image of the person is continuously adjusted to match the movement patterns of the person detected with the multi-camera system in the real environment of the industrial robot. In addition, the position and/or the movement patterns of the industrial robot are determined. The data can be displayed in the same way as a virtual image of the industrial robot, together with the virtual image of the person. Starting from the position and/or the movement patterns of the industrial robot, with a knowledge of the position of the person and his or her movement patterns in the virtual space in which the virtual images are displayed, a potential hazard can be determined. The potential hazard is compared with a threshold value, in order to act upon the motion control of the industrial robot when the threshold is exceeded and to bring about a shutdown of the industrial robot or to slow down the movement of the industrial robot.

A disadvantage of such a camera system is the effect of the sensitivity of the cameras to changing lighting conditions, which can lead to errors in image recognition. A 3D image computation, performed on the basis of the data from the cameras, also requires a large amount of computing power. In particular, the calculation and display of a 3D point cloud from the data from the cameras requires multiple computing cycles. In this process, a 3D point cloud can have a set of points, wherein the points can represent the data from the cameras and/or additional parameters and the point cloud, in other words the set of points, can be represented in the form of an unordered spatial structure in a mathematical vector space with, for example, three dimensions. In addition, a basic calibration of the camera system implies a calibration of multiple cameras with each other, which requires additional effort.

Often the cameras are mounted as external cameras for monitoring the immediate environment of the industrial robot outside the industrial robot, or on the industrial robot itself. However, changing shading patterns which occur in the execution of the handling and/or production tasks of the industrial robot require placement of a plurality of external cameras in the space in order to ensure a reliable observation of the industrial robot and its environment. If the industrial robot is finally moved to another location, the positions of the external cameras must consequently be adjusted, in order to continue to provide a careful monitoring of the environment of the industrial robot.

As an alternative to a camera system, laser systems are also currently used for monitoring the environment of the industrial robot. However, the designs involving laser sensors are also reaching their limits, as often only a 2D coverage is possible, similar to a camera system. To avoid "dead" angles or shadow/shading effects in the monitoring process, the use of multiple laser sensors is also required, leading to high costs. Since laser sensors often have a relatively high weight, the dynamics of the industrial robot can be reduced, if the sensors are installed in and/or on the industrial robot. In addition, laser sensors usually comprise rotating parts and the rotational impulses then impact on the industrial robot when the laser sensors are placed on and/or attached to the industrial robot, causing a deterioration in the control of the industrial robot.

SUMMARY

The present invention specifies a method for controlling an industrial robot in an automation system, which comprises an improved collision detection and avoidance, and additionally provides an optimized industrial robot system.

EXAMPLES

According to one aspect, a method for controlling an industrial robot is provided, wherein position data of the industrial robot are detected. Environment data from an object in an environment of the industrial robot are detected with an environment detection unit. The position data of the industrial robot and the environment data of the object in the environment of the industrial robot are transformed into a common figure space in which a control figure is defined for the industrial robot and an object figure of the object in the environment of the industrial robot is represented.

A parameter set is created, which takes into account a dimensioning of the control figure in the figure space. The parameter set comprises a temporal and spatial correlation of the position data of the industrial robot and the environment data of the object in the environment of the industrial robot, and takes into account the movement history of the industrial robot and/or of the object in the environment of the industrial robot. An action instruction for the industrial robot is generated if the control figure and the object figure in the figure space satisfy a predefined criterion in relation to each other.

According to another aspect an industrial robot system is provided. The industrial robot system having an industrial robot having an environment detection unit, a position detection unit and a control unit, which is designed to carry out a method as claimed in any one of the preceding claims.

According to another aspect a detection system is proposed, at least including an environment detection unit and a position detection unit. Position data of the industrial robot are detected with the position detection unit of the industrial robot, and environment data from an object in an environment of the industrial robot are detected with the environment detection unit.

BRIEF DESCRIPTION OF THE DRAWINGS

The properties, features and advantages described above and the manner in which these are achieved, will become clearer and more comprehensible in conjunction with the following description of exemplary embodiments, which are explained in more detail in connection with the drawings. Shown are.

DETAILED DESCRIPTION

Figure 1:
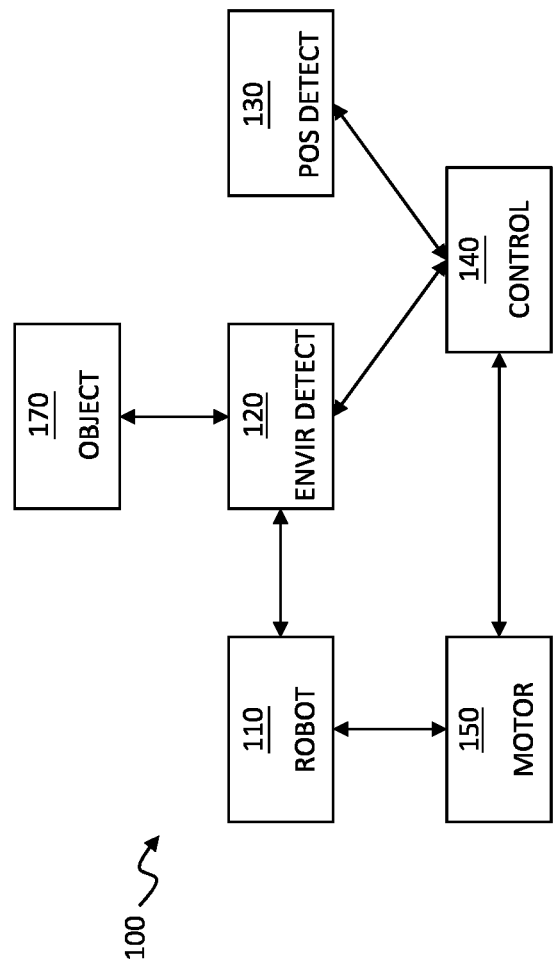
FIG. 1 a schematic structure of an industrial robot system.

Based on the following figures an exemplary embodiment of a method for controlling an industrial robot in an industrial robot system is described. The industrial robot system here can be used in the context of an automation system. The use specification should not be understood restrictively, however, as it can also be applied in other areas of industry, production and manufacturing, in which an industrial robot works together with a human being, and is also not restricted to the example of an industrial robot in an automation system described in the following.

It should be noted that the figures are only schematic in nature and are not true to scale. In keeping with this, components and elements shown in the figures may be shown exaggerated or reduced in size for a better understanding. It should also be noted that the reference numerals in the figures have been chosen to be the same for identically designed elements and/or components and/or dimensions.

An industrial robot refers to a programmable machine that can have multiple movable axes or modules and using tools, grippers or other manufacturing means, can perform handling and/or manufacturing tasks in automation technology. An industrial robot which collaborates with human beings and is not separated from them by protective devices in the production and manufacturing process is referred to as a collaborative robot, or a Cobot for short. Hereafter, the Cobot is referred to as the industrial robot.

The industrial robot must therefore be able in particular to detect people and to act accordingly in dangerous situations. Industrial robots from the prior art usually detect people exclusively by the measurement of torques or force sensors. This means, however, that the industrial robot can only detect collisions with people once an actual collision has occurred. At no time prior to this can the industrial robot assess whether or not there is a computable probability of a collision occurring with a human.

The proposed method for controlling the industrial robot can in this case be used advantageously, since it enables a timely collision detection of the industrial robot with a person or an object that can be, for example, another industrial robot. The method works with a figure space, i.e. a mathematical-geometric description of a real space and its physically existing objects. In addition, the figure space can comprise physically non-existent objects, in other words virtual objects. The figure space can be designed to be n-dimensional, the figure space having at least three dimensions or lengths, and other dimensions can be obtained, for example, by the addition of a speed or a temperature. The figure space can thus be compared with a virtual space, with its contents forming the objects that are physically present. In this case, the physically existing objects can either be known or acquired using a detection unit and/or a sensor device. The physically existing objects and the virtual objects can be represented in the figure space in a simplified form or with a high degree of detail. A conscious change in the properties of the physically present and the virtual objects in the figure space is also possible. In addition, a dynamic change in the figure space can be provided.

The proposed method provides for creating, from position data of the industrial robot and environmental data of the object in the environment of the industrial robot, a control figure for the industrial robot and an object figure for the object in the environment of the industrial robot in the figure space. The object can be, for example, a human being, another industrial robot or a device, that is, for example, a machine or system of the automation system. In this case, the dimensions of the control figure and/or the object figure can be changed via a parameter set. For example, the parameter set can comprise a temporal and spatial correlation of the position data of the industrial robot and the environment data of the object in the environment of the industrial robot. Also, the parameter set can take into account the movement history of the industrial robot and/or of the object in the environment of the industrial robot, thus their velocity and/or acceleration and/or their relative velocity and/or relative acceleration. In this context also, an additive decomposition of the velocities and/or accelerations into a tangential and a radial component can be carried out. In particular, by the method the movement and/or the distance to the object in the environment of the industrial robot can be determined on each axis of movement of the industrial robot.

An action instruction for collision avoidance is generated for the industrial robot as soon as the control figure and the object figure in the figure space satisfy a given criterion in relation to each other. The specified criterion can be an intersection pattern of the object figure and the control figure in the figure space. For example, the control figure and/or the object figure can comprise a protective zone, i.e. a three-dimensional structure, for example a ball, a wall, etc., which can be dynamically adapted to the respective movement behavior of the control figure and/or the object figure and moves with the control figure and/or the object figure. By the protection zone around the control figure and/or around the object an intersection pattern, thus for example an intersection point, an intersection line, an intersection surface, an intersection volume, etc. of the two figures in the figure space, can be determined at an early stage, before the two figures would actually intersect in the form of one of the above variants. Thus the sooner a potentially hazardous situation in the figure space can be detected, the sooner an action instruction for the industrial robot can be generated in this context. The specified criterion can also form an intersection pattern on an entire planned trajectory of the control figure with the object figure, wherein the intersection pattern can be formed as described above. Also in this context, the control figure and/or the object figure can be configured with the abovementioned protection zone.

Similarly, the specified criterion can be implemented in the form of overshooting or undershooting a predefined threshold value. A conceivable criterion for exceeding a threshold is an acceleration and/or velocity of the control figure and/or the object figure, which are above a specified acceleration and/or above a specified velocity, each of which can form a threshold value. A threshold value can also be specified by a specific distance between the control figure and the object figure in the figure space, or between the industrial robot and the object in the real space. A measured distance which is determined continuously, for example, between the control figure and the object figure or between the industrial robot and the object can differ from the prescribed distance, i.e. the threshold value. In particular, the measured distance for another object between the industrial robot and the object in the real space can yield a shorter distance than the prescribed distance between the industrial robot and the object, thus leading to an undershooting of the threshold value.

The proposed method provides flexible options to mitigate hazardous situations and/or potential collision situations by different strategies being specified for collision avoidance, and due to the different representations of the control figure and/or the object figure and their variable scaling in the figure space, hazardous situations can be detected and quickly avoided by using the collision avoidance strategies. Also, different detection units and different sensors can form part of an extension and to an optimization of the proposed industrial robot system.

A method for controlling an industrial robot is proposed. The method provides that position data of the industrial robot are detected and environment data of an object in an environment of the industrial robot are captured with an environment detection unit. The position data of the industrial robot and the environment data of the object in the environment of the industrial robot are transformed into a common figure space, in which a control figure is defined for the industrial robot and an object figure of the object in the environment of the industrial robot is represented. The control figure can also be implemented as a robot figure. A parameter set is created, which takes into account a dimensioning of the control figure in the figure space and which comprises a temporal and spatial correlation of the position data of the industrial robot and the environment data of the object in the environment of the industrial robot, and takes the movement history of the industrial robot and/or of the object in the environment of the industrial robot into account. An action instruction is generated for the industrial robot when the control figure and the object figure satisfy a predefined criterion or a plurality of predefined criteria in relation to each other in the figure space.

The industrial robot collaborates with human operators and/or within an environment in which static and/or dynamic obstacles are either temporarily or permanently present in the task space of the industrial robot, i.e. in the region or sub-region in which the industrial robot performs tasks. While working alongside the human operators and/or during the movement within its task space the industrial robot is not separated from the people or the environment of the task space by any protective device. For this reason, it is important to ensure the safety of the human operators and to take protective measures to prevent a collision between the industrial robot and a human being and/or other objects, such as other robots or walls or other obstacles in the task space of the industrial robot. In particular, it is important to initiate these measures before a collision occurs. The proposed method can be used advantageously in this context. The described method works with the above-mentioned figure space.

A figure space is understood to mean a mathematical-geometric description of the image of a real space with its physically present objects. In addition to the actually existing objects the figure space can also comprise virtual, that is not physically present, objects. The figure space can be n-dimensional, wherein the figure space can have at least three dimensions or lengths. Other dimensions may be produced, for example, from the addition of a speed and/or a temperature and/or other parameters. A figure space can be compared with a virtual space, the contents of which correspond to the actually existing space. In this case, the actually existing objects are either known or acquired by a detection unit and/or a sensor device. Also, purely virtual objects can be represented in the figure space. The objects can be displayed in the figure space in simplified form or with a modified scaling. Furthermore, the figure space can be formed statically or dynamically. The figure space can be displayed using a display device, such as a pair of video goggles, a tablet or a smartphone, and can be an aid for the configuration, maintenance and analysis of the control method for the industrial robot and the associated industrial robot system. Alternative display devices for displaying the figure space are also possible.

For the specified criterion for the control figure and the object figure in the figure space an intersection pattern of the control figure for the industrial robot and of the object figure of the object in the environment of the industrial robot is determined. An intersection pattern can be implemented, for example, in the form of a point of intersection, a line of intersection, an intersection surface, an intersection volume, etc. In addition, for the specified criterion for the control figure and the object figure in the figure space, an intersection pattern of the control figure and of the object figure of the object in the environment of the industrial robot can be determined on an entire planned trajectory of the control figure of the industrial robot. The intersection pattern can be formed in the same way as explained above. In addition, for the specified criterion for the control figure and the object figure in the figure space, an undershoot of a threshold or an overshoot of the threshold of the control figure of the industrial robot and/or the object figure of the object in the environment of the industrial robot can be determined.

To prevent a collision of the industrial robot with a human being and/or other objects, it may be expedient to use the proposed method for controlling the industrial robot in order to easily be able to satisfy a criterion that gives rise to the generation of an action instruction for the industrial robot. Depending on the chosen representation of the control figure of the industrial robot and the object figure of the object in the environment of the industrial robot, the specified criterion can be an intersection pattern of the two figures in the figure space and/or an intersection pattern on an entire planned trajectory of the control figure with the object figure. The intersection pattern can be formed as a point of intersection, an intersection line, an intersection surface or an intersection volume. Also, to determine the specified criterion that leads to an action instruction for the industrial robot, a response to a threshold value can be used. In this case, the threshold value can be a prescribed distance, acceleration, speed, etc. For example, undershooting of the threshold value (prescribed distance) may occur in the case of a distance between the control figure and the object figure, which has a lower value than the value of the prescribed distance for the figures. Exceeding or undershooting the threshold value can cause the triggering of the action instruction for the industrial robot. Exceeding the threshold value can occur, for example, in the case of a velocity and/or acceleration of the object figure which is higher than the prescribed value of the velocity and/or acceleration for the object figure. The same is possible for the control figure for the industrial robot. The proposed method can therefore be applied flexibly to different initial situations.

The planned trajectory of the control figure of the industrial robot is determined and represented in the figure space as a polygonal chain or a mathematical function. The representation of the planned trajectory of the control figure of the industrial robot as a polygonal chain or as a mathematical function simplifies the prediction and/or calculation of a possible collision between the control figure for the industrial robot and the object figure of the objects in the environment of the industrial robot.

A distance between a position of the object figure of the object in the environment of the industrial robot and the position of the control figure for the industrial robot in the figure space is specified and represented as such. The prescribed distance in the figure space can form the threshold value, for example. A measuring distance between the position of the object figure and the position of the control figure in the figure space is continuously determined. The threshold value is undershot if a measuring distance is determined which has a lower value than the threshold value. The proposed approach makes it possible to provide so-called virtual "light barriers". These can be formed dynamically or statically in the figure space, and interrupted if another object enters between the prescribed distance for the control figure of the industrial robot and the object figure of the object in the environment of the industrial robot. Also, the prescribed distance can be any distance between the position of the industrial robot and a known position in the figure space. In addition to a light barrier as described above, it is conceivable to form multiple such virtual light barriers in the figure space and to implement a network or a grid of virtual light barriers.

For dimensioning the control figure for the industrial robot and/or to provide a dimensioning of the object figure of the object in the environment of the industrial robot the movement history of the industrial robot is taken into account by the velocity of the industrial robot and/or the acceleration of the industrial robot being determined from the position data of the industrial robot, and/or the movement history of the object in the environment of the industrial robot is taken into account by the velocity of the object and/or the acceleration of the object being determined from the environment data of the object in the environment of the industrial robot.

The control figure and/or the object figure in the figure space can be dimensioned dynamically from the movement history of the control figure and/or the object figure and is not defined statically. Also, the dimensioning of the control figure and/or the object figure can be carried out using other parameters, such as a temperature or a potential danger to an object to be transported from the industrial robot. In this case, the control figure and/or the object figure in the figure space can comprise a virtual image of the industrial robot and/or the object figure. In addition, it is conceivable to place a so-called protection zone around the virtual image of the industrial robot and/or around the virtual image of the object figure in the figure space. The protection zone can be implemented in the form of a three-dimensional structure, for example, a sphere, a wall or another geometrical object and be dynamically adjusted to the motion of the industrial robot and/or the movement of the object. The size, i.e. the dimensioning of the protection zone, can be carried out in accordance with the above explanation.

The control figure for the industrial robot in the figure space can be represented in a simplified form as a geometric control body. The object figure of the object in the environment of the industrial robot can also be represented in the figure space in simplified form as a geometric object body. For the representation of the control figure and/or the object figure it is not necessary to reproduce the real image of the industrial robot and/or of the object in the environment of the industrial robot. The geometric control body and/or the geometric object body can be constructed from a geometric object such as a cube, cuboid, cylinder, sphere, cone, etc., or from a plurality of such geometric objects, wherein the one or more geometric objects correspond at least to the outermost points of the industrial robot and/or of the object. This means that the geometric object/objects cover the dimensions of the industrial robot and/or the dimensions of the object in the environment of the industrial robot. In particular, by reducing the representation of the control figure of the industrial robot or the object figure to simple geometric shapes in the figure space, the computational effort can be advantageously reduced.

The object figure of the object in the environment of the industrial robot and/or the control figure of the industrial robot can be represented as a direction vector in the figure space. The direction vector has a length which is dependent on the movement of the object figure of the object in the environment of the industrial robot and/or on the movement of the control figure of the industrial robot. Also, in order to calculate potential collisions a direction vector can be used to represent the object figure and/or the control figure. The length of a vector can also be dependent on a relative velocity of the object figure to the control figure, in the case of a direction vector representation of the object figure. Furthermore, it is conceivable to change the direction vector or direction vectors for the case of a representation of a vector field using other parameters such as, for example, the level of danger, if the control figure is to be considered and this is intended for the transport of an object. Geometrical bodies can also be added to the direction vectors.

During a movement of the control figure for the industrial robot and/or during a movement of the object figure of the object in the environment of the industrial robot in the figure space the control figure for the industrial robot and/or the object figure of the object in the environment of the industrial robot is represented in the figure space on an enlarged scale and/or scaled with a higher degree of detail. An enlarged scaling takes into account the dynamics of the control figure of the industrial robot and/or the dynamics of the object figure of the object in the environment of the industrial robot. Also, a scaling with a higher degree of detail can reflect the dynamics of the control figure and/or the dynamics of the object figure, and/or a potential hazard to the object which the industrial robot is transporting, for example. With an enlarged scale and/or with a scaling at a higher degree of detail, an imminent collision in the respective areas can be detected more quickly. This also has an advantageous effect on the sensitivity of the system.

The control figure for the industrial robot in the figure space can be extended to include an object. To do so, the control figure of the industrial robot in the figure space is extended by one dimension of the object. The control figure is not designed to be static, but can be extended dynamically if, for example, the industrial robot is transporting an object which is not harmless, such as a knife, etc.

The environment data of the object in the environment of the industrial robot captured with the environment detection unit are represented as a point in the figure space. A point cloud in the figure space has a plurality of points comprising distance information from the object in the environment of the industrial robot. The points of the point cloud are filtered according to a filtering rule and the object figure of the object in the environment of the industrial robot is created from this. The described approach makes the calculation of the object figure of the object in the environment of the industrial robot more compact, faster and simpler.

An action instruction for the industrial robot comprises the following actions: slowing down the movement of the industrial robot; restriction of the industrial robot to a given moment, which is provided by at least one motor of the industrial robot; switching off the industrial robot; a movement of the industrial robot out of a task space in which the industrial robot performs specified tasks when the object in the environment of the industrial robot is located in the task space, and transferring the industrial robot into a waiting position, wherein the industrial robot moves back into the task space if the object in the environment of the industrial robot has left the task space; and/or a movement of the industrial robot on an alternative trajectory when the object in the environment of the industrial robot is moving on the planned trajectory of the industrial robot. The alternative trajectory for the industrial robot can be specified or determined dynamically in the figure space.

The action instructions for the industrial robot can be variable in form and adapted to suit the relevant situation. It is possible to generate one of the above instructions for the industrial robot, but multiple instructions for the industrial robot can also be combined with one another, for example, the slowing down of the movement of the industrial robot and the restriction of the industrial robot to a given moment that can correspond to a specified torque or specified force.

Furthermore an industrial robot system is also proposed, having an industrial robot with an environment detection unit, a position detection unit and a control unit, which is designed to carry out a method according to any one of the preceding claims.

The proposed industrial robot system can contribute to improving the safety of people who work with the industrial robot, since using the proposed industrial robot system different mechanisms are provided for mitigating potentially occurring hazard situations, and simplified display options are provided that allow a rapid assessment of the underlying situation and a timely initiation of an action, for example in the form of the action instruction for the industrial robot.

The position detection unit can also be designed in the form of a positioning system and/or a localization system. In addition, it is conceivable that the position detection unit is designed in the form of a pair of Smart Glasses, a mobile phone, tablet etc. and forwards the acquired position data or known position data to the control unit and thus interacts with the industrial robot system.

The industrial robot is designed as a multi-axis robot and has at least one arm, which is suitable for picking up an object. The industrial robot has at least one motor for propulsion and for providing a moment. The environment detection unit of the industrial robot is designed to capture environmental data of an object in an environment of the industrial robot and transmit it to the control unit. The at least one arm of the industrial robot can comprise a plurality of axes. These can be implemented as rotational and/or translational axes and can be driven using the at least one motor of the industrial robot. Also, the at least one motor can be used to provide a moment, in other words a torque or force if a linear motor is used for the industrial robot. The environment detection unit can be implemented, for example, in the form of one or more LIDAR systems and/or in the form of one or more TOF cameras (TOF, time of flight) or an alternative scanning system with which the environment of the industrial robot can be scanned.

The environment detection unit of the industrial robot can be implemented as an external environment detection unit. The environment detection unit does not necessarily need to be integrated in the industrial robot, but can also be implemented in the form of an external environment detection unit in the relevant space. It is also conceivable to use both an internal environment detection unit on the industrial robot and also an external environment detection unit.

The environment detection unit of the industrial robot has a plurality of TOF cameras and/or LIDAR systems that are integrated into the at least one arm of the industrial robot and/or are designed as an external plurality of TOF cameras and/or LIDAR systems. In particular, it can be provided that a plurality of TOF cameras and/or LIDAR systems are integrated in each arm, at least in each motion arm, which can also be referred to as an axis or movement axis, so that at least the range of movement of each motion arm and/or a 360° range around each motion arm can be captured. The capture range can be increased by the use of multiple LIDAR systems and/or multiple TOF cameras. In addition, the use of multiple LIDAR systems and/or TOF cameras creates a redundancy capability and provides an improved failure safety and information security. The advantage of a time-of-flight camera is that the field of view or the observation range of the camera can be recorded at the same time, whereas with a LIDAR system a scan must be performed.

The control unit is designed to transform the position data of the industrial robot and the environment data of the object in the environment of the industrial robot into a common figure space, which is designed to define a control figure for the industrial robot and to represent an object figure of the object in the environment of the industrial robot. The control unit is designed to create a parameter set, which takes into account a dimensioning of the control figure in the figure space and which comprises a temporal and spatial correlation of the position data of the industrial robot and the environment data of the object in the environment of the industrial robot, and takes the movement history of the industrial robot and/or of the object in the environment of the industrial robot into account. The control unit is further designed to generate an action instruction for the industrial robot if the control figure and the object figure in the figure space satisfy a predefined criterion in relation to each other. The control unit can be used advantageously to process the environment data and to determine a possible imminent collision between the industrial robot and the object in the environment of the industrial robot.

The control unit can be integrated internally into the industrial robot or designed as an external control unit.

The industrial robot comprises a sensor device, which can also be implemented as an external sensor device. The sensor device is designed to capture environment data of the object in the environment of the industrial robot and transmit it to the control unit. The industrial robot can comprise additional sensor equipment or the industrial robot system, in the case of an external sensor device. The sensor device can extend and optimize the industrial robot system and can be designed, for example, in the form of a radar sensor and/or an ultrasonic sensor.

FIG. 1 shows a schematic structure of an industrial robot system 100. The industrial robot system 100 comprises an industrial robot 110. This can be designed as a multi-axis robot and have at least one arm which can be suitable for picking up an object. For example, the industrial robot 110 in this context can be intended for the transport of goods, which can present a potential hazard to a human being in the case of a pointed or sharp object. Additional criteria for a potential hazard can be, for example, heat, extreme cold, harmful radiation, heavy weight, or comparable items. The axes of the industrial robot 110 can be designed as translational and/or rotational axes and enable the industrial robot 110 to make translational and/or rotational movements. To drive the axes, the industrial robot 110 can have at least one motor 150, which can also provide a moment for the industrial robot 110 in the form of a torque or a force.

The industrial robot 110 can have an environment detection unit 120 with which the industrial robot 110 can scan the environment, wherein either a point of the environment or a so-called "cluster", i.e. multiple points of the environment that may have similar properties and can be merged to form a set, can be analyzed. Using the environment detection unit 120, environment data from an object 170 in the environment of the industrial robot 110 can therefore be captured. For example, the environment detection unit 120 can be implemented in the form of one or more time-of-flight (TOF) cameras. A TOF camera is a 3D camera system which can measure a distance with the so-called time of flight (TOF) method. To do so the surrounding area is illuminated with a light pulse and the TOF camera measures the time that the light for each pixel takes to travel to an object 170 in the environment of the industrial robot and back to a sensor of the TOF camera. This time is directly proportional to the distance. The TOF camera therefore records the distance to the object imaged on each pixel. The imaged object 170 can be a person, another industrial robot or, for example, a device.

Alternatively, the environment detection unit 120 can be implemented in the form of a LIDAR system. It is also conceivable that the industrial robot 110 comprises a plurality of such environment detection units 120, and these are implemented as combinations of TOF cameras and LIDAR systems. A LIDAR system can constitute a form of laser scanning based on the same principle as the time-of-flight camera, so that a (pulsed) light beam is emitted to scan the environment, and the light beam is reflected from an object 170 in the environment back to a receiver of the LIDAR system. From the signal propagation time and the velocity of light it is possible to calculate the distance to the object 170 in an observation range or a field of view. In contrast to a TOF-camera, the field of view or the observation range of the LIDAR system cannot be recorded all at once, but must be scanned.

Also, the environment detection unit 120 of the industrial robot 110 can comprise a plurality of environment detection units 120 on the at least one arm of the industrial robot 110, which are implemented as LIDAR systems and/or as time-of-flight cameras and/or as alternative scanning systems. The plurality of environment detection units 120 can be mounted, for example, on the industrial robot 110 such that for every possible motion and/or position or pose of the industrial robot 110 no dead angles can occur. Furthermore, a positioning of the plurality of environment detection units 120 can also be carried out in such a way that a possible direction change of the industrial robot with the environment detection unit 120 results in such an area being captured as is relevant for the planned movement or target position.

In addition, the environment detection unit 120 of the industrial robot 110 can comprise a sensor device, i.e. one or more sensors, which are designed to capture environmental data from the object 170 in the environment of the industrial robot 110. The sensor devices can extend and optimize the industrial robot system 100 and can be designed, for example, in the form of a radar sensor and/or an ultrasonic sensor and/or an alternative sensor, with which environment data of the object 170 in the environment of the industrial robot 110 can be captured.

It is also possible to use an external environment detection unit in the form of a TOF camera and/or in the form of a LIDAR system and/or in the form of a sensor device. This can be used in addition to the environment detection unit 120 of the industrial robot 110 to allow reliable monitoring or scanning of the environment of the industrial robot and objects that may be located in the environment of the industrial robot. An external environment detection unit can also comprise a plurality of external environment detection units to provide an extensive monitoring or scanning facility for the surroundings of the industrial robot and the industrial robot itself.

In addition to the environment detection unit 120 described above, the industrial robot system 100 can comprise a position detection unit 130. The position detection unit 130 can be used in the industrial robot system 100, for example, to detect position data of the industrial robot 110 and/or to forward these to a control unit 140. The position detection unit 130 in this case can be designed as a TOF camera, as a LIDAR system, or as any other detection unit which is capable of detecting position data of the industrial robot. For example, the position detection unit 130 may be implemented in the form of an external unit in the industrial robot system 100. The position detection unit can also be designed in the form of a positioning system and/or a localization system. In addition, it is conceivable that the position detection unit is designed in the form of a pair of Smart Glasses, a mobile phone, tablet, indoor GPS/outdoor GPS, etc., and detects the position data of people, objects and/or other industrial robots and interacts with the industrial robot system.

The position data of the industrial robot 110 and the environment data of the object 170 in the environment of the industrial robot are forwarded to the control unit 140 of the industrial robot system 100. The control unit 140 of the industrial robot system 100 can be implemented as a central unit or be integrated into the industrial robot 110. The control unit 140 transforms the position data of the industrial robot 110 and the environment data of the object 170 in the environment of the industrial robot 110 into the common figure space, that is to say, the mathematical-geometric description of the real space and its physically existing objects and/or physically non-existent, hence virtual objects. The above environment data and position data are processed by the control unit 140 in the figure space, wherein the control unit 140 defines a control figure for the industrial robot 110 in the figure space and specifies an object figure of the object 170 in the environment of the industrial robot 110. The control unit 140 also creates a set of parameters, wherein the parameter set takes a dimensioning of the control figure in the figure space into account. Also, a dimensioning of the object figure can be captured by the parameter set. For example, the control figure and/or the object figure in the figure space each include a protection zone which can be implemented in the form of a three-dimensional structure, for example, a sphere, a wall or another geometrical object and be dynamically adjusted to the movement of the industrial robot and/or the movement of the object. In particular, it is possible to perform the dimensioning of the protection zone on the basis of the above-mentioned parameter set.

The parameter set can comprise a temporal and spatial correlation of the position data of the industrial robot 110 and the environment data of the object 170 in the environment of the industrial robot 110. In addition, the parameter set can comprise the movement history of the industrial robot 110 and/or of the object 170 in the environment of the industrial robot 110. In the course of taking account of the movement history of the industrial robot 110, the velocity of the industrial robot 110 and/or the acceleration of the industrial robot 110 is determined from the position data of the industrial robot 110. This can involve a decomposition of the velocity and/or the acceleration of the industrial robot 110 into a radial component and a tangential component. Similarly, the movement history of the object 170 in the environment of the industrial robot 110 can be taken into account by the velocity of the object 170 and/or the acceleration of the object 170 being determined from the environment data of the object 170 in the environment of the industrial robot 110. This can also involve a decomposition of the velocity and/or the acceleration of the object 170 in the environment of the industrial robot 110 into a radial component and a tangential component. In this context, it is also conceivable that a relative velocity with respect to the object 170 and the industrial robot 110 and/or a relative acceleration with respect to the object 170 and the industrial robot 110 is determined.

The control figure and/or the object figure can thus be dimensioned in the figure space dynamically from the movement history of the control figure and/or the object figure, and therefore does not need to be defined statically by the control unit 140. Also, the dimensioning of the control figure and/or the object figure can be carried out using other parameters, such as a temperature or the potential danger to the object to be transported from the industrial robot 110.

It is possible that the control unit 140 determines the velocity of the industrial robot 110 and/or the acceleration of the industrial robot 110 and/or the velocity of the object 170 and/or the acceleration of the object 170 directly from the position data of the industrial robot 110 and/or from the environment data of the object 170 in the environment of the industrial robot 110, before the control unit 140 transforms the position data of the industrial robot 110 and the environment data of the object 170 in the environment of the industrial robot 110 into the figure space. Alternatively, the control unit 140 can determine the velocity of the industrial robot 110 and/or the acceleration of the industrial robot 110 and/or the velocity of the object 170 and/or the acceleration of the object 170 from the position data of the industrial robot 110 and/or from the environment data of the object 170 in the environment of the industrial robot 110, in fact only after the transformation of the said data into the figure space. This can depend on whether the object 170, which is captured in the form of a point cloud by the environment detection unit 120 of the industrial robot 110, which unit can be implemented, for example, as a single time-of-flight camera or as a single sensor, is detected even before the transformation of the data from the point cloud into the figure space, or only in the context of other information in the figure space. This is possible because the figure space can be designed to be n-dimensional and can therefore comprise additional information or parameters, which facilitates a detection of the object 170 from the environment data and the additional information or parameters.

The control unit 140 is designed to generate an action instruction for the industrial robot 110 if the control figure and the object figure in the figure space satisfy a predefined criterion in relation to each other. Which specified criterion or specified criteria in the figure space gives or give rise to the action instruction of the control unit 140 for the industrial robot 110, will be explained in the following figures. The generated action instruction for the industrial robot 110 is transmitted from the control unit 140 to the at least one motor 150 of the industrial robot 110 in order to be able to control the industrial robot 110 in accordance with the action instruction.

This means that an action instruction for the industrial robot 110 can cause a deceleration of the motion of the industrial robot 110, which slows down the movement of the industrial robot 110 in order thus, for example, to prevent a collision with a person or an object 170. Also, the action instruction for the industrial robot 110 can be designed in such a way that the industrial robot 110 is thereby limited to a specified moment. This can be defined by the control unit 140, for example. Also, the industrial robot 110 can be shut down completely, in other words, put out of operation, as part of the action instruction. In addition, it is conceivable that in the course of an action instruction the industrial robot 110 moves out of a task space if the object 170 in the environment of the industrial robot 110 is located in the task space. For example, the task space can form a sub-region or a subset of the figure space in which the industrial robot 110 can perform specified tasks. For the time or time period in which the object 170 in the environment of the industrial robot 110 is located in the task space the industrial robot 110 can be transferred into a waiting position and only move back into the task space when the object 170 in the environment of the industrial robot 110 has left the task space. In this case, the mathematical boundary conditions of the task space can be different from the mathematical boundary conditions of the figure space 260.

In addition, the action instruction for the industrial robot 110 can provide a movement of the industrial robot 110 on an alternative trajectory. The alternative trajectory can be determined dynamically in the figure space by the control unit 140. Alternatively, the control unit 140 can define the alternative trajectory for the industrial robot 110. The movement of the industrial robot 110 can then take place on an alternative trajectory when the object 170 in the environment of the industrial robot 110 is moving on the planned trajectory of the industrial robot 110.

In the following text, details in the figures which have been already explained in the previous figures will not be repeated.

Figure 2:
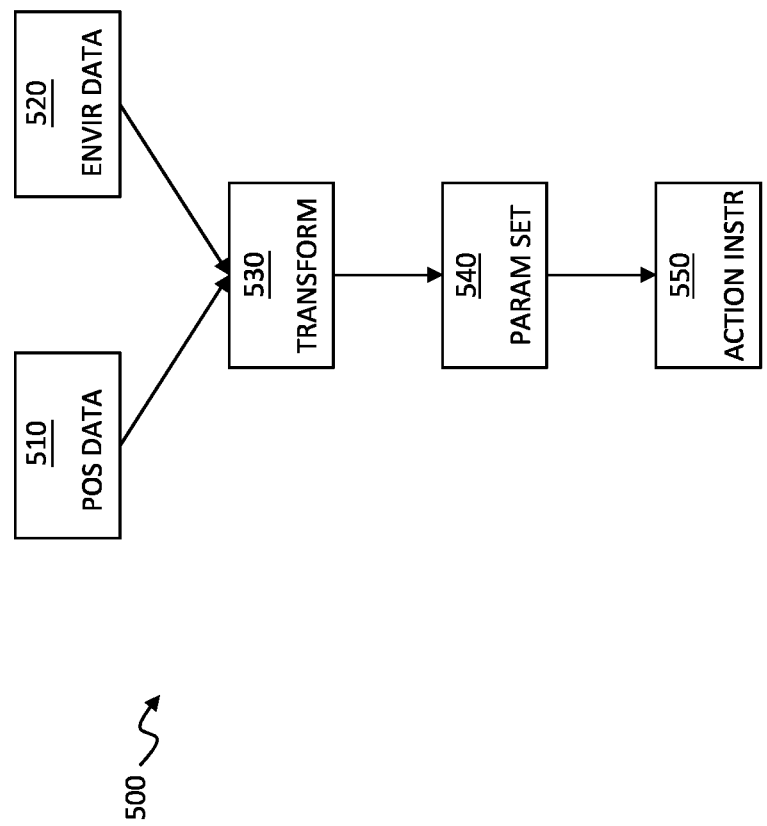
FIG. 2 a schematic sequence of a method for controlling an industrial robot of the industrial robot system.

FIG. 2 shows a schematic sequence of a method 500 for controlling the industrial robot 110 of the industrial robot system 100 shown in FIG. 1. In a first method step 510, position data of the industrial robot 110 can be detected by the control unit 140, which the control unit 140, for example, may have received by transmission from the position determination unit 130 in FIG. 1. A second method step 520 can provide that the environment detection unit 120 of the industrial robot 110 captures environment data from the object 170 in the environment of the industrial robot 110. In a third method step 530, the control unit 140 can transform the position data of the industrial robot 110 and the environment data of the object 170 in the environment of the industrial robot 110 into the figure space.

Alternatively, the data referred to can be first merged in the control unit 140 and a filtering of the data can be performed and the data can be submitted to a pattern recognition process. In this context, it is possible to correlate the position data of the industrial robot 110 and the environment data of the object 170 in the environment of the industrial robot 110 with each other temporally and spatially.

It is also conceivable that the control unit 140 additionally determines from the position data of the industrial robot 110 the velocity of the industrial robot 110 and/or the acceleration of the industrial robot 110, and/or from the environment data of the object 170 determines the velocity of the object 170 and/or the acceleration of the object 170 and/or a relative velocity of the object 170 with respect to the industrial robot 110 and/or a relative acceleration of the object 170 with respect to the industrial robot 110. The control unit 140 can then transform the above-mentioned data into the figure space and define and display the control figure, which can include the above-mentioned protection zone, and the object figure, which can also include the above-mentioned protection zone, in the figure space.

Within the third method step 530, the control unit 140 can define the control space for the industrial robot 110, which may include the above-mentioned protection zone, and display it in the figure space. Furthermore, in the third method step 530 the control unit can represent the object figure of the object 170 in the environment of the industrial robot 110 in the figure space, which figure can also comprise the above-mentioned protection zone. In a fourth method step 540 the control unit 140 can create a parameter set via which the dimensioning of the control figure or the object figure in the figure space together with the respective protection zone can be taken into account. Also, the parameter set can comprise the temporal and spatial correlation of the position data of the industrial robot 110 and the environment data of the object 170 in the environment of the industrial robot 110, which can enable a filtering of the data and/or a pattern recognition.

The parameter set can also take account of the movement history of the industrial robot 110 and/or of the object 170 in the environment of the industrial robot 110. In addition, similarly to the above description the control unit 140 can additionally determine from the position data of the industrial robot 110 the velocity of the industrial robot 110 and/or the acceleration of the industrial robot 110, and/or from the environment data of the object 170 can determine the velocity of the object 170 and/or the acceleration of the object 170 and/or a relative velocity of the object 170 with respect to the industrial robot 110 and/or a relative acceleration of the object 170 with respect to the industrial robot 110.

In a fifth method step 550 the control unit 140 can generate an action instruction for the industrial robot 110 if the control figure 230 and the object figure 220 in the figure space 260 satisfy the predefined criterion in relation to each other. To this end the control unit 140 can determine an intersection pattern 295 of the control figure 230 of the industrial robot 110 and the object figure 220 of the object 170 in the figure space 260. The intersection pattern 295 can be implemented in the form of a point of intersection, a line of intersection, an intersection surface or, for example, an intersection volume. Also, the intersection pattern 295 can be implemented in the form of an overlap of the two figures. In addition, for the specified criterion for the control figure 230 and the object figure 220 in the figure space 260, the control unit 140 can determine an intersection pattern 295 of the control figure 230 and the object figure 220 on the entire planned trajectory of the control figure 310 of the industrial robot 110, wherein the intersection pattern 295 can be implemented as above. The control unit 140 can also define a threshold value in the figure space 260, such as a prescribed distance 350, a specified acceleration, velocity, etc., wherein the control unit 140 can specify an exceeding of the threshold value by the control figure 230 or the object figure 220 or an undershoot of the threshold value by either the control figure 230 or the object figure 220 as the specified criterion in the figure space 260.

For example, an undershoot of the threshold value (prescribed distance 350) can occur if a distance between the control figure 230 and the object figure 220 in the figure space 260 that is determined by the environment detection unit 120 has a lower value than the value of the prescribed distance 350 for the two figures. Exceeding or undershooting of the threshold value can cause triggering of the above-mentioned action instruction for the industrial robot 110. Exceeding the threshold value can occur, for example, in the case of a velocity and/or acceleration of the object figure which is higher than the prescribed value of the velocity and/or acceleration for the object figure.

If the control figure 230 and the object figure 220 in the figure space 260 satisfy the specified criterion, which can be specified, for example, by the control unit 140 for the control figure 230 and the object figure 220, so the control unit 140 generates the action instruction for the industrial robot 110. In this case, the action instruction can be implemented in the form of the above action instructions and be dependent on the shape of the intersection pattern 295 or the overlap. The control unit 140 can also determine the specified criterion for the control figure 230 and the object figure 220 and the generation of the action instruction for the industrial robot 110 in the case of the above-mentioned alternative, in which the data are initially merged in the control unit 140 and subjected to the filtering and/or the pattern recognition, in the same way as was explained in connection with the fourth and fifth method step 540, 550.

Figure 3:
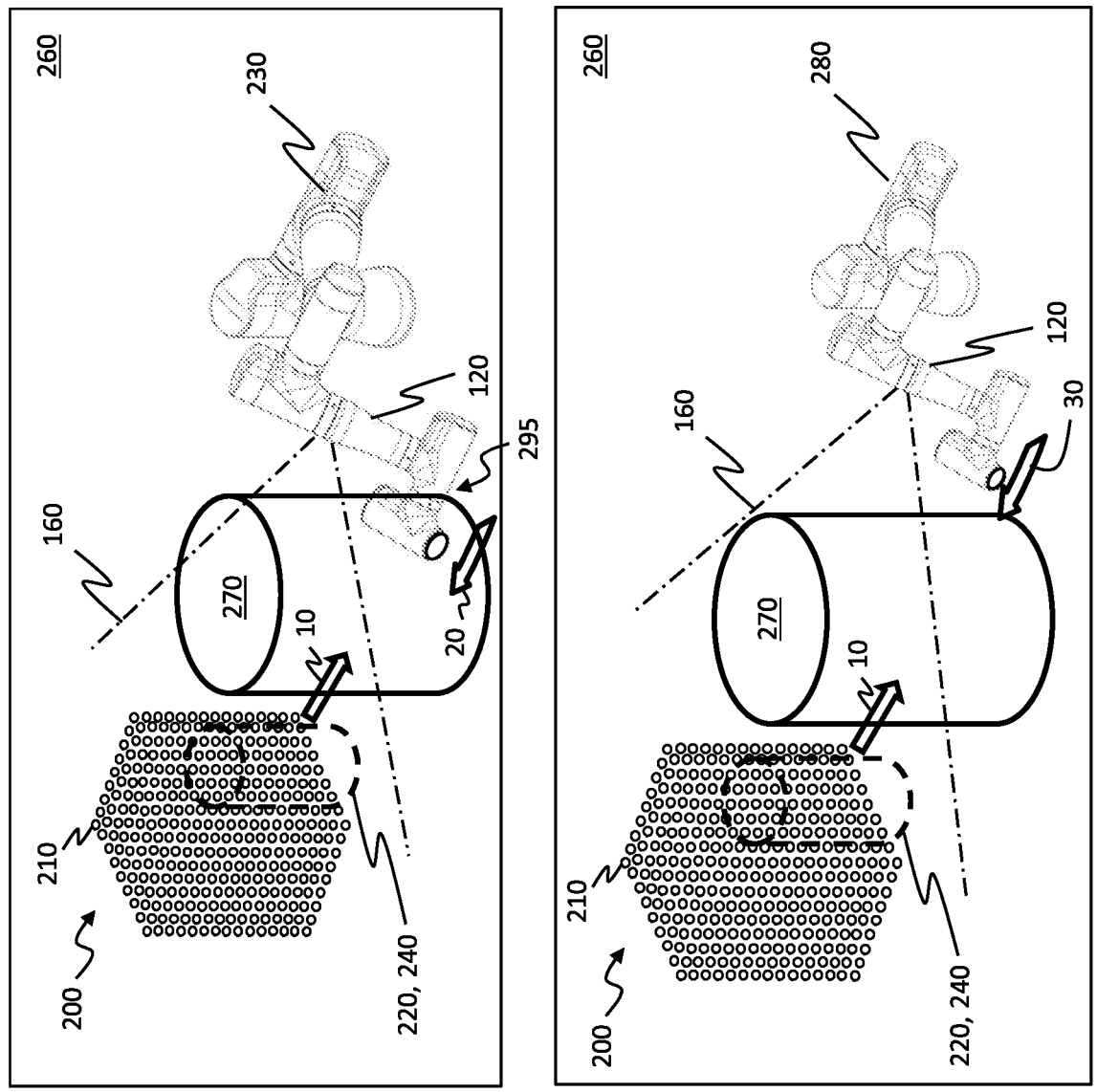
FIG. 3 a drawing of a first and second scaled view of an object figure and a control figure in a figure space.

FIG. 3 shows a first scaled view 600 and a second scaled view 610 for the control figure 230 for the industrial robot 110 and the object figure 220 of the object 170 in the environment of the industrial robot 110 in the figure space 260. In particular, during a movement of the control figure 230 and of the object figure 220 in the figure space 260 the control figure 230 and the object figure 220 can be displayed by the control unit 140 on an enlarged scale so that an imminent collision can be detected faster. Also, the scaling of the two figures can be related to weight and/or temperature if the figure space 260 includes additional constraints or dimensions. The environment data of the object 170 captured in a field of view 160 with the environment detection unit 120 of the industrial robot 110, which can be mapped, for example, onto pixels of the TOF camera and/or the LIDAR system, can comprise a single point 210 or a plurality of points in the form of a point cloud 200, and a depth information item, or distance to each recorded point 210. The depth information can be determined by the control unit 140 from a support vector originating from the position data of the industrial robot 110, which can represent a position of the industrial robot 110, up to a position of the environment detection unit 120 on the industrial robot 110. The above procedure allows the acquisition of the point cloud 200, which can be represented mathematically in the figure space 260 by the control unit 140, for example in the form of a matrix.

The control unit 140 can filter the point cloud 200, which can comprise the distance information of the object 170 in relation to the industrial robot 110, according to a filtering rule. The filtering rule can specify the application of a sorting algorithm, such as the bubble sort algorithm or a comparable sorting algorithm. For example, the filtering rule can be designed such that three extreme points of the point cloud 200 can be determined by the control unit 140, which can form the vertices. The control unit 140 can use an algorithm to insert a two-dimensional surface into the vertices of the point cloud 200, which can correspond to a rough approximation in which the points are selected from the point cloud 200 that lie on the two-dimensional surface which in the case of an approximation of the control figure 230 of the industrial robot 110 to the object 170 can be implemented in the form of a representation with a higher resolution, thus with multiple points and a different two-dimensional surface. Also, as part of the filtering rule the control unit 140 can select the points, in other words, for example, filter the points, that have the shortest distance from the control figure 230. In addition, it is conceivable that the control unit 140 can use the points that were used in the preceding calculation as a starting point for a new calculation of the filtering rule.

The movement of the object 170 can result in the control unit 140 extending or enlarging the sorting algorithm, which can also correspond to a search algorithm. To record a movement behavior or to analyze the movement history of the object 170, the environment detection unit 120 of the industrial robot 110, which in this context can be implemented, for example, as a time-of-flight camera, requires two recorded images. For example, the TOF camera can have a frame rate of 50 Hz or 200 Hz for the recorded images. It is also possible to design the sorting or search algorithm so that a point 210 of a first image recorded with the environment detection unit 120 of the industrial robot 110 can be recovered on a second image using the sorting or search algorithm.

The control unit 140 can combine points of the point cloud 200 with similar properties into a set, the "cluster" described above. This cluster can be combined by the control unit 140 to form an object figure 220 and/or a geometric object body 240 in the figure space 260. For example, the geometric object body 240 can have the shape of a cylinder. Alternatively, other shapes such as a cube, sphere, cone, etc. are possible. The reduction of the object figure 220 to simple geometric shapes in the figure space for a geometric object body 240 can reduce the required computation time in an advantageous way. In FIG. 3, the geometric object body 240 in the first scaled view 600 can move in a first direction of motion 10 in the figure space 260. Due to the motion of the geometric object body 240, the control unit 140 can enlarge the display of the geometric object body in the form of an enlarged-scale object body 270, wherein the enlarged scaling can be based on the velocity and/or the acceleration of the object 170 in the real space. The movement and/or the speed of the geometric object body 240 can be determined by the control unit 140 from the derivative of the point cloud 200 recorded at discrete times or of the images of the TOF camera and/or the LIDAR system of the environment detection unit 120. Based on the determined speed of the object 170 and the industrial robot 110 in the real space, the control unit 140 can display the control figure 230 of the industrial robot 110 and the object figure 220 or the geometric object body 240 enlarged in the form of the enlarged-scale object body 270.

In addition, FIG. 3 shows the control figure 230 of the industrial robot 110 in the figure space 260 in the first scaled view 600. The control figure 230 may also comprise the environment detection unit 120 and its field of view 160 in the figure space 260. As an example, FIG. 3 shows a single environment detection unit 120, which can be integrated into the arm of the control figure 230 of the industrial robot 110. This is intended purely for the purpose of increased clarity and does not indicate any restriction in the design of the industrial robot 110 or the control figure 230 in the figure space 260. The control figure 230 of the industrial robot 110 can move, for example, in a second direction of motion 20 so that the control unit 140 can also display the control figure 230 in the figure space on an enlarged scale. The enlarged scaling of the control figure 230 can also be based on the velocity and/or the acceleration of the industrial robot 110 in the real space.

The control figure 230 and the geometric object body 240 can additionally comprise a protection zone in the figure space 260. This structure has only been chosen as an example for explanation and could have been implemented in other ways, i.e. with a protection zone for each of the given figures.

The first scaled view 600 shows an intersection pattern 295 of the enlarged control figure 230 and the enlarged geometric object body 270 in the figure space 260. For example, the intersection pattern 295 in FIG. 3 can be implemented in the form of an intersection point. Alternatively, the intersection pattern can be implemented in the form of an intersection line, an intersection surface, or an intersection volume. Since the intersection pattern 295, thus for example, the intersection point, can according to the above explanation correspond to the specified criterion which the control figure 230 and the object figure 220 in the figure space 260 can satisfy in relation to each other, the control unit 140 can therefore generate the action instruction for the industrial robot 110 in the real space. For example, the action instruction for the industrial robot 110 can specify that the industrial robot 110 should slow down the movement, in other words that the industrial robot 110 should decelerate and advance in the real space with reduced speed.

The situation described is shown in the second scaled view 610 in the lower portion of FIG. 3. As a result of the action instruction for the industrial robot 110 the control unit 140 can display the control figure, which can move in a third direction of motion 30, in the form of a reduced-scale control figure 280, and thereby reduce the likelihood of a possible collision occurring between the industrial robot 110 and the object 170 in the real space, and/or between the control figure 230 and the object figure 220 in the figure space 260, and mitigate the hazardous situation. In so doing, the control unit 140 can shrink the reduced-scale control figure 280 until it matches the real dimensions of the industrial robot 110 in the real space. A further reduction of the reduced-scale control figure 280 is not provided for the control unit 140. The same considerations can also apply to the dimensions of the enlarged-scale geometric object body 270 or to the dimensions of the geometric object body 240 or to the dimensions of the object figure 220 in the case of a reduced scaling in relation to the actual dimensions of the object 170.

If the control unit 140 still cannot prevent the reduced-scale control figure 280 and the larger-scale geometric object body 270 in the figure space 260 from intersecting in the intersection pattern 295 despite a reduced scaling of the reduced-scale control figure 280, and if the control unit 140 also cannot determine an alternative trajectory for the industrial robot 110 in the real space or for the reduced-scale control figure 280 in the figure space 260, then the control unit 140 can generate an alternative action instruction for the industrial robot 110, for example to restrict the industrial robot 110 to a limited moment or to shut down the industrial robot 110.

Figure 4:
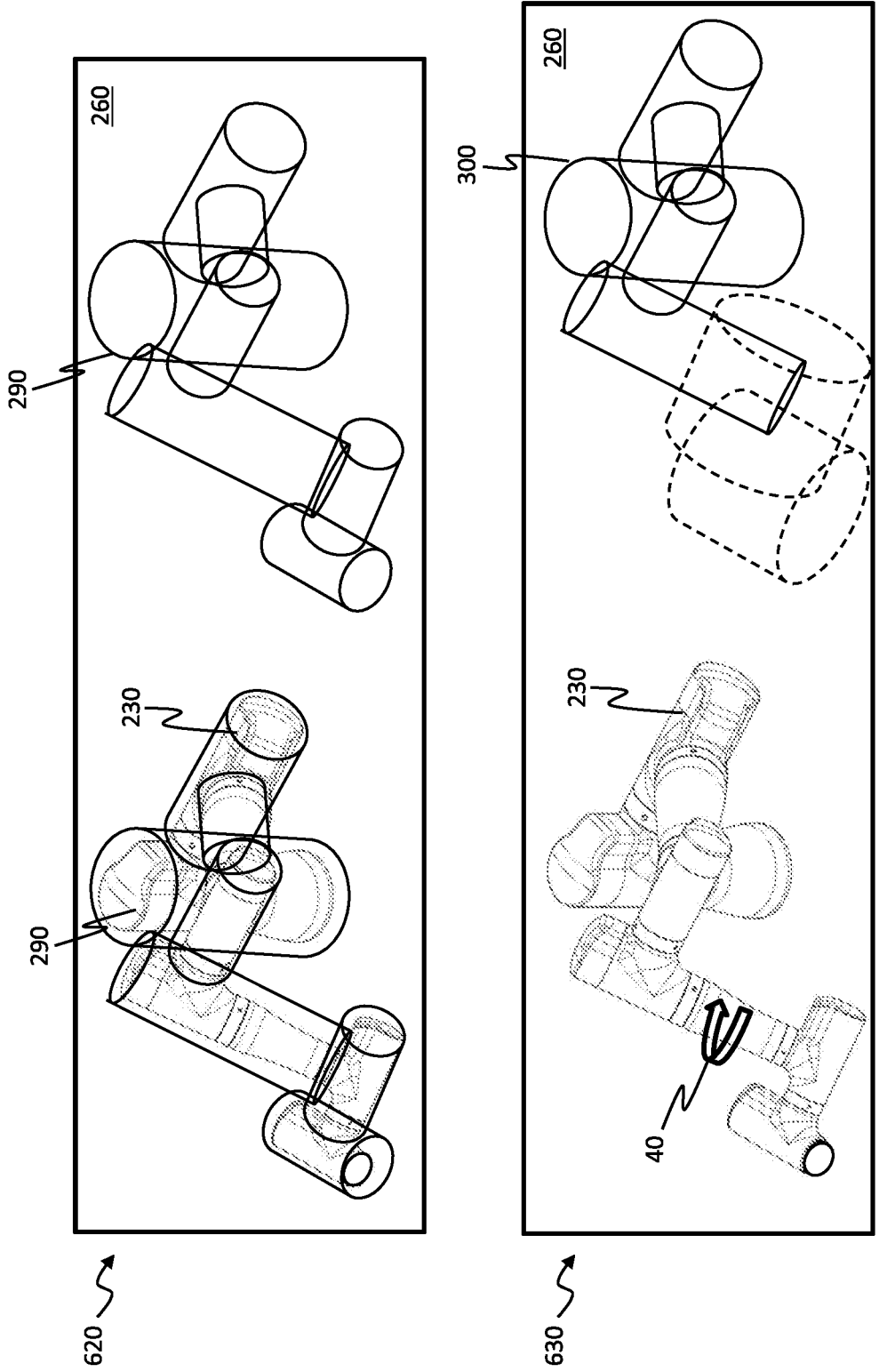
FIG. 4 a drawing of a third and fourth scaled view of the control figure in the figure space.

FIG. 4 shows a third scaled view 620 and a fourth scaled view 630 of the control figure 230 for the industrial robot 110 in the figure space 260. The third scaled view 620 and the fourth scaled view 630 have only been chosen for the control figure 230 as an example, however, and can likewise be applied to the object figure 220 in FIG. 3. The third scaled view 620 of the control figure 230 of the industrial robot 110 in the left-hand section of the image shows how the control unit 140 simplifies the representation of the control figure 230 to a geometric control body in the figure space 260. In this case the individual axes of the industrial robot 110 in the real space, or the individual axes of the control figure 230 in the figure space 260, are each represented as separate geometric bodies in the figure space 260. The geometric control body 290 which is scaled up to a high level of detail can have, for example, a plurality of cylinders in the figure space 260, which can represent the dimensions of the control figure 230 in the figure space 260 or of the industrial robot 110 in the real space, wherein the dimensions of the highly detailed scaled geometric control body 290 are never smaller than the real dimensions of the industrial robot 110 in the real space. Alternatively, the control unit 140 can represent the geometric control body 290 with a single cylinder or simulate a comparable geometric body such as a cube, cuboid, cone, etc., or a plurality of these comparable geometric bodies. The control unit 140 can also represent further objects in the environment of the industrial robot 110 as further geometric object bodies in the figure space 260. In addition, the representation of virtual objects in relation to the geometric control body 290 in the figure space is also possible.

In the left-hand image section shown in FIG. 4 of the third scaled view 620 of the control figure 230, the simulated version of the control figure 230 by the control unit 140 appears in the form of the geometric control body 290 scaled to a high degree of detail in the figure space 260. The right-hand image section of the third scaled view 620, on the other hand, shows only the geometric control body 290 scaled up to a high level of detail, which is represented in this form, for example by the control unit 140 in the figure space 260.

An advantage of the representation of the geometric control body in the form of a plurality of cylinders, cubes, cuboids and/or other geometric objects is that with the increased level of detail in the figure space 260 a higher resolution of the collision prediction can be achieved than is possible with a representation of the geometric control body 250 that does not contain a plurality of cylinders, cubes, cuboids and/or other geometric objects. The control unit 140 can also change the dimensions of the object figure 220, the control figure 230, the geometric object body 240, the enlarged-scale geometric object body 270, the geometric control body 290 scaled to a high level of detail, and additional virtual objects represented in the figure space 260 and described above, as a function of their velocity and/or acceleration and/or other parameters. For example, a direction of motion indicated in the figure space 260 of the control figure 230, of the geometric control body 290 scaled to a high level of detail and/or the object figure 220, of the geometric object body 240, which has either already been completed as in FIG. 3 or is planned, can result in the control unit 140 enlarging the control figure 230, the geometric control body 290 scaled to a high level of detail and/or the object figure 220 and/or the geometric object body 240 in the figure space 260.

The control unit 140 can also display only single cylinders, cubes, cuboids, etc. of the geometric control body 290 scaled to a high degree of detail, and/or individual geometric bodies from which the geometric object body 240 can be assembled, on an enlarged scale in the figure space 260, wherein the scale can be enlarged in relation to the completed or planned direction of motion of the geometric control body 290 scaled to a high degree of detail or of the geometric object body 240. A representative example is given by the fourth scaled view 630 of the control figure 230. The control figure 230, as shown in the left half of the image, can move in the direction of the fourth movement direction 40, for example, and may be displayed by the control unit 140, as shown in the right half of the image, for example as a scaled-up geometric control body 300 with a high level of detail in the figure space 260 with enlarged cylinders, cubes, cuboids, etc., which can relate to the fourth movement direction 40 of the control figure 230. Alternatively, the control unit 140 can enlarge the entire geometric control body 300, which is scaled to a high level of detail and enlarged, in the figure space 260. It is further conceivable for the control unit 140 also to perform a dynamic shape change in the figure space 260 for the geometric control body 290 scaled to a high level of detail or for the geometric object body 240.

In addition, it is conceivable that the control unit 140 automatically switches dynamically from displaying the geometric control body 250 and/or the geometric object body 240 with a low level of detail into displaying the geometric control body 290 scaled with a high degree of detail or into a display of the enlarged-scale geometric control body 300 with a high level of detail and/or a display of the geometric object body scaled with a high degree of detail, or to a display of the enlarged-scale geometric object body with a high level of detail in the figure space 260. For example, this can be carried out in the event of an overshoot or undershoot of the above-mentioned threshold value.

Another conceivable option is for the control unit 140 to change the display of the geometric control body 290 scaled to a high degree of detail or a display of the enlarged-scale geometric control body 300 with a high level of detail and/or a display of the geometric object body scaled with a high degree of detail and/or a display of the enlarged-scale geometric object body with a high level of detail back into a display of the geometric control body 250 and/or the geometric object body 240 with a low level of detail. This is particularly possible in the case of a mitigated hazardous situation. An intersection pattern of the geometric bodies in the figure space 260 can in turn lead to generation of the above-mentioned action instruction and/or a combination of action instructions for the industrial robot 110 in the real space. Therefore the control unit 140 can display many different scaled views of the above figures or bodies with different levels of detail in the figure space 260 and dynamically adapt the level of detail, for example, to the respective situation.

Figure 5:
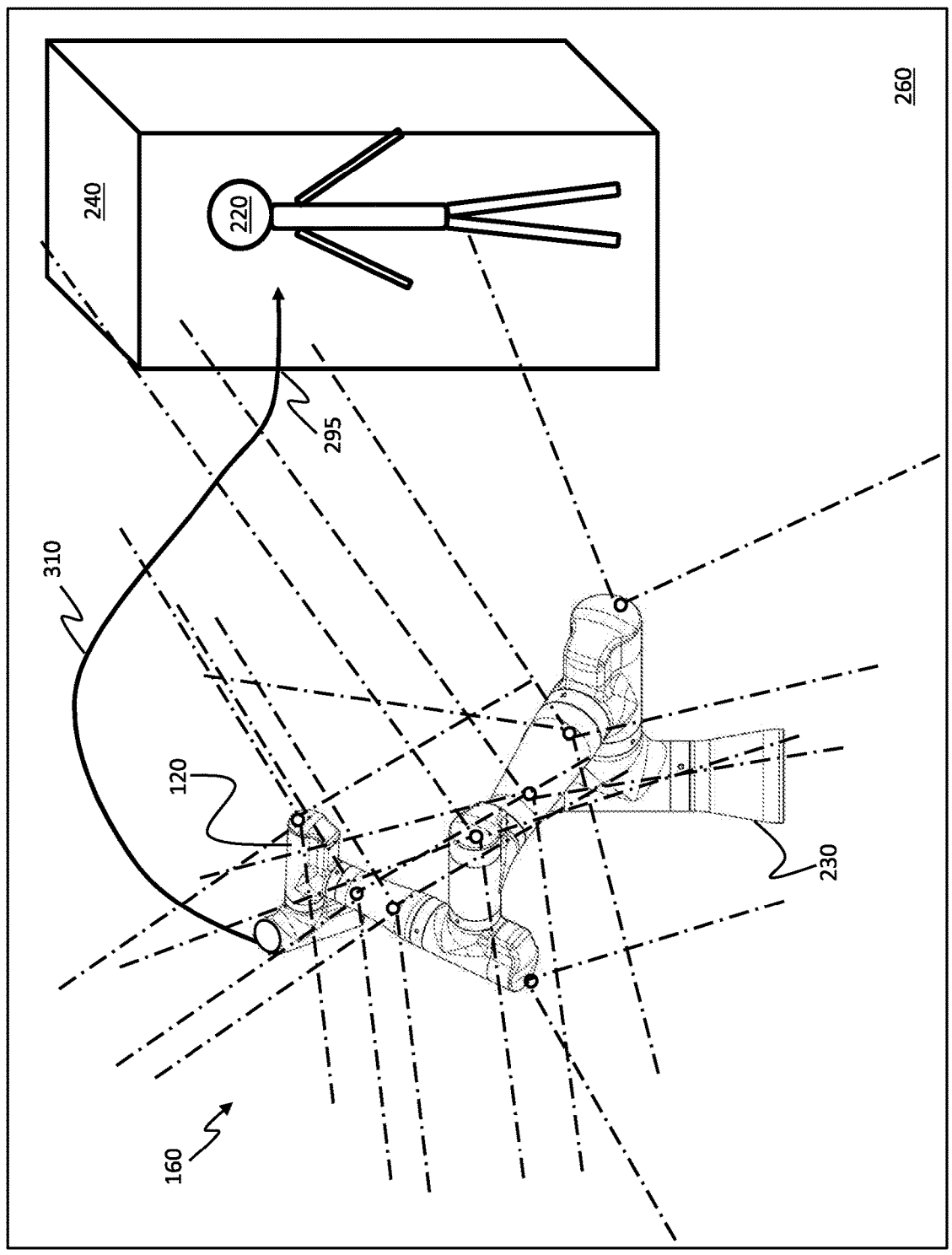
FIG. 5 a drawing of a planned trajectory of the control figure in the figure space.

In addition, the control unit 140 can display the planned trajectory 310 of the control figure 230 in the figure space 260. An example of this is shown in FIG. 5. FIG. 5 also shows a schematic representation of a plurality of environment detection units 120, which can be integrated, for example, into the control figure 230 in the figure space 260 or into the at least one arm of the industrial robot 110 in the real space and can be implemented in the form of a plurality of LIDAR systems and/or a plurality of TOF cameras, along with their field of vision 160. The control unit 140 can represent the planned trajectory 310 of the control figure 230 in the figure space 260 in the form of a polygonal chain as in FIG. 5, or as a mathematical function. In addition, in accordance with the above description the control unit 140 can represent an object figure 220 of the object 170 in the environment of the industrial robot 110 in the figure space 260. For example, as shown in FIG. 5 the object figure 220 can represent a person in the figure space 260. In addition, the object figure 220 can also be displayed by the control unit 140 in a simplified form as a geometric object body 240, in order to reduce the computational effort.

The control unit 140 can then, as stated above, determine an intersection pattern 295 with the object figure 220 or the object body 240 over the entire planned trajectory 310 of the control figure 230. This intersection pattern 295 in FIG. 5 can be implemented, for example, in the form of an intersection point and form the specified criterion in response to which the control unit 140 generates an action instruction for the industrial robot 110 in the real space. In doing so, the control figure 230 of the industrial robot 110 can move along the planned trajectory of the control figure 310 in the figure space 260 as far as the intersection pattern 295, which in FIG. 5 is implemented as the point of intersection of the control figure 230 and the geometric object body 240. The action instruction for the industrial robot 110 is not generated by the control unit 140 until reaching the intersection pattern 295, in other words the point of intersection of the control figure 230 on the planned trajectory of the control figure 310 and the geometric object body 240.

The action instruction can be one of the above-mentioned action instructions and/or a combination of the listed action instructions. For example, the industrial robot 110 in the real space and the control figure 230 in the figure space 260 can be forced to move on an alternative trajectory. The control unit 140 can determine the alternative trajectory for the control figure 230, for example, dynamically on the basis of the movement history of the object figure 220 or the object body 240, comprising the velocity of the object figure 220 and/or the acceleration of the object figure 220, and/or based on the movement history of the control figure 230, comprising the velocity of the control figure 230 and/or the acceleration of the control figure 230, and/or on the basis of additional constraints in the figure space 260. In addition, the control unit 140 can specify the alternative trajectory for the control figure 230 or the industrial robot 110. The control unit 140 can thus generate an action instruction for the industrial robot 110 which causes the industrial robot 110 to move along the alternative trajectory.

Figure 6:
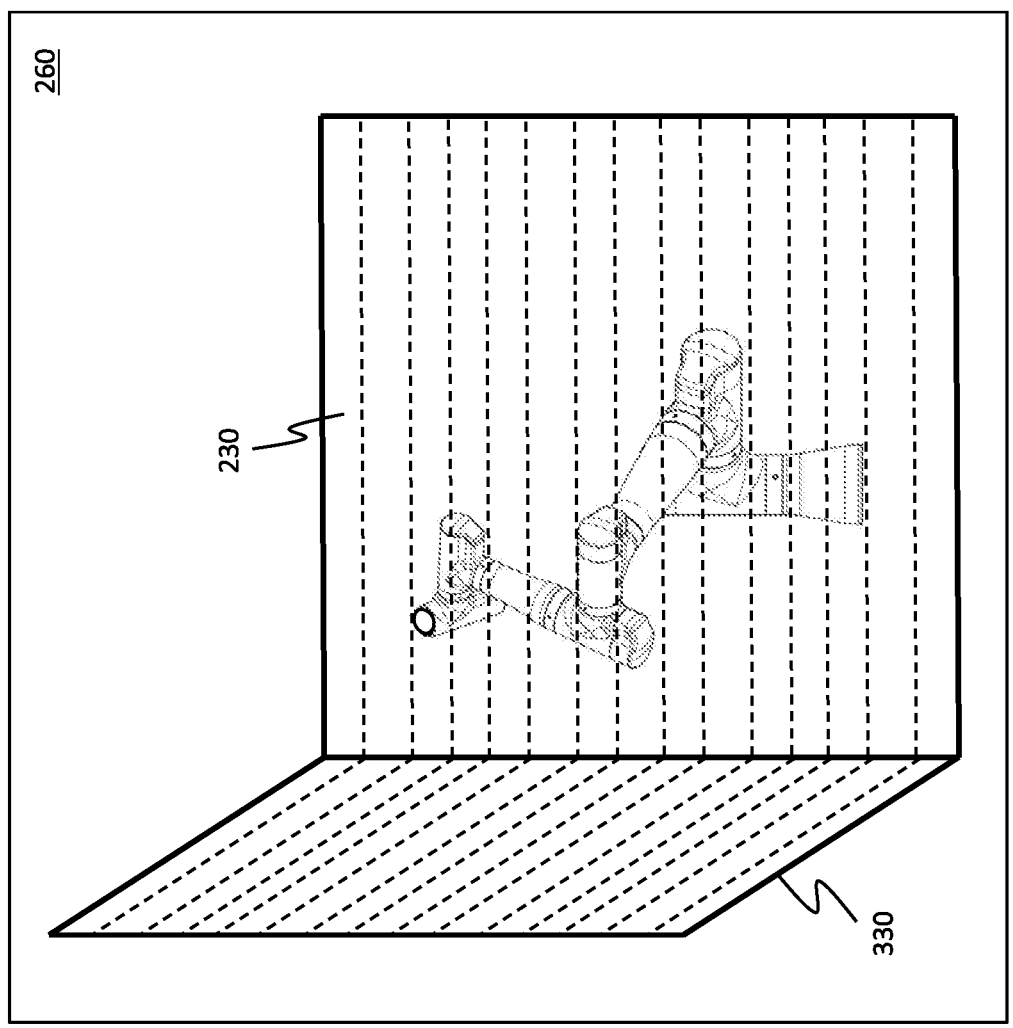
FIG. 6 a drawing of a protection zone around the control figure in the figure space.

FIG. 6 shows the protection zone 330, which, for example, the control figure 230 can contain in the figure space 260. The protection zone 330 can be a virtual object which does not exist in the real space and is generated by the control unit 140 in the figure space 260. For example, the protection zone 330 in FIG. 6 is implemented in the form of a protective wall. Other geometric designs of the protected zone 330 are also conceivable, such as, for example, a sphere, etc. The control unit 140 can be designed so as to form the protection zone 330 statically around the control figure 230 in the figure space 260 so that this does not move due to a movement of the control figure 230 in the figure space 260. Similarly, the control unit 140 can form the protection zone 330 dynamically, so that a movement of the control figure 230 results in the protection zone 330 around the control figure 230 moving at the same time.

Also, the movement of the control figure 230 can result in the region comprised by the protection zone 330 being enlarged dynamically, wherein the region comprised by the protection zone 330 in the figure space 260 can be enlarged by the control unit 140 with increasing velocity of the control figure 230 and/or with increasing acceleration of the control figure 230. In this context, it is also conceivable that the control unit 140 for the object figure 220 in the figure space 260 forms an analogous protection zone 330, which can be implemented dynamically or statically and can be adapted to the velocity of the object figure 220 and/or the acceleration of the object figure 220 and can be increased in size with increasing velocity of the object figure 220 and/or increasing velocity, so that the region covered by the protection zone 330 is also increased in size. In addition, the control unit 140 can be designed to form the protection zone 330 around the geometric control body 250 or around the geometric object body 240 in the figure space 260 statically or dynamically. It is also conceivable to take the protection zone 330 into account at the time of dimensioning the control figure 230 and/or the geometric control body 250 and/or the object figure 220 and/or the geometric object body 240, and that it is not displayed by the control unit 140 separately in the figure space 260.

It is further conceivable that in order to define the protection zone 330 around the control figure 230 and/or the object figure 220 and/or the geometric control body 250 and/or the geometric object body 240, the control unit 140 takes into account additional constraints or parameters, which can include, for example, a weight, a temperature, an object, a workpiece, etc.

In the case of an intersection pattern 295, which can be implemented as a point of intersection, a line of intersection, an intersection surface or an intersection volume of the object figure 220 and/or the geometric object body 240 with the protection zone 330 surrounding the control figure 230 and/or with the protection zone 330 surrounding the geometric control body 250 in the figure space 260, the control unit 140 can generate the action instruction for the industrial robot 110 in the real space. For the possible characteristics of the generated action instruction, refer to the above explanation.

Figure 7:
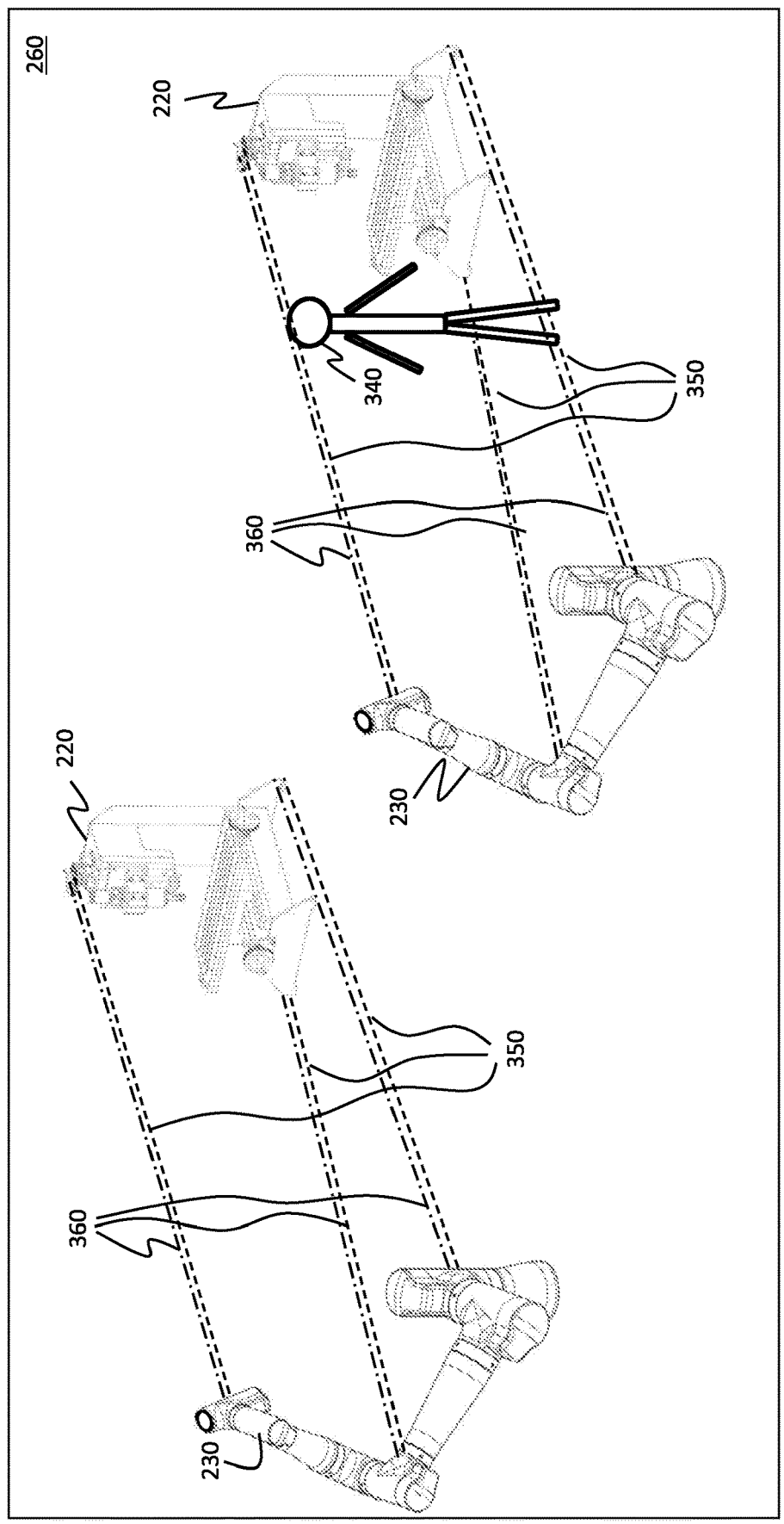
FIG. 7 an illustration of a threshold value that is undershot.

FIG. 7 shows an example of a virtual light barrier between the position of the control figure 230 and the position of the object figure 220 in the figure space 260. The object figure 220 in FIG. 7 can represent a machine or system of an automation system in the figure space 260. For example, the position of the control figure 230 and the position of the object figure 220 in relation to each other in the figure space 260 can be located within a distance 350 specified by the control unit 140. In this case, the control unit 140 may have determined the value of the prescribed distance 350 and/or the values of the prescribed distance 350 using the position detection unit 130 and/or the environment detection unit 120 and/or additional sensors or alternative detection units that can determine distances, and can use the prescribed distance 350 as a threshold value of the virtual light barrier. The threshold value can therefore form one of the above-mentioned versions of the specified criterion that the control figure 230 and the object figure 220 can satisfy with respect to each other in the figure space 260.

In FIG. 7, three prescribed distances 350 are shown by dashed lines at selected points between the position of the control figure 230 and the position of the object figure 220, which form the threshold value of the virtual light barrier. The threshold value is therefore not limited to one value, but can also comprise multiple values. Also, the number of prescribed distances 350 shown as dashed lines in FIG. 7 has been chosen arbitrarily, and can equally well differ from this value. The accuracy and the reliability of the virtual light barrier can be increased using a plurality of predefined distances 350 which are drawn as dashed lines in FIG. 7, because an undershooting of the threshold value which comprises a plurality multiple values can be detected more rapidly by the control unit 140.

By the environment detection unit 120 of the industrial robot 110 in the real space a measured distance 360 between the position of the industrial robot 110 and/or the positions of the industrial robot 110 and the position of the object 170 in the environment of the industrial robot 110 and/or the positions of the object in the environment of the industrial robot 110 can be acquired, and these can be continuously transformed into the figure space 260 by the control unit 140, so that 260 the measured distance 360 between the positions of the control figure 230 of the industrial robot 110 drawn in FIG. 7 and the positions of the object figure 220 of the object 170 in the environment of the industrial robot 110 in the figure space can be determined. The measured distance 360 is shown in FIG. 7 by three example positions using the dashed and dotted line shown. In the left-hand section of the image the measured distance 360 matches the prescribed distance 350 between the positions of the control figure 230 and the positions of the object FIG. 220 in the figure space, which means the virtual light barrier has not been interrupted and the threshold value, i.e. the prescribed distance 350, has not been violated. The control unit 140 therefore generates no action instruction for the industrial robot 110 in the real space.

For example, if an additional object in the real space intervenes between the position of the industrial robot 110 and the position of the object 170 in the environment of the industrial robot 110, then environment data of this additional object can be collected by the environment detection unit 120 and/or the additional sensors and/or an alternative detection unit and transformed into the figure space 260 by the control unit 140 and displayed as a further object figure 340. In the chosen example shown in FIG. 7 in the right half of the image, the additional object figure 340 can represent, for example, a person in the figure space 260 who walks between the control figure 230 and the object figure 220 and interrupts the virtual light barrier.

If the environment detection unit 120 of the industrial robot 110 in the real space can determine, due to the additional object between the position of the industrial robot 110 and the position of the object 170, a measured distance 360 for the three example positions between the control figure 230 and the object figure 220 which differs from the prescribed distance 350 for the three example positions between the control figure 230 and the object figure 220, this is transformed by the control unit 140 into the figure space 260, so that in the figure space 260 the measured distance 360 between the control figure 230 and the object figure 220, with the additional object figure 340 placed between them, can be evaluated. The threshold value, i.e. the prescribed distance 350, comprising the three example values for the three positions between the control figure 230 and the object figure 220 can be violated, for example, if the measured distance 360 comprising the three example values for the three positions between the control figure 230 and the object figure 220 comprises a lower value for each of the three positions than the value of the prescribed distance 350 for the three positions between the control figure 230 and the object FIG. 220 in the figure space 260. In the event that the threshold value is violated, the control unit 140 can be designed to generate one of the above-mentioned action instructions for the industrial robot 110, or a combination thereof.

The exemplary embodiment shown in FIG. 7 is not limited to a virtual light barrier. Instead of a virtual light barrier the control unit 140 can specify, for example, the distance 350 between two or more positions in the figure space 260 which form the threshold value and which are evaluated by the control unit 140 in the figure space 260 in comparison to a measured distance 360 between the two or more positions. The control unit 140 can then generate the action instruction or a combination of operating instructions for the industrial robot 110 in the real space in the same way as for a violation of the threshold value. It is also conceivable for the threshold value to be formed by a velocity specified by the control unit 140 and/or a specified acceleration of the control figure 230 relative to the object figure 220, which is evaluated by the control unit 140 together with a measured velocity and/or a measured acceleration of the control figure 230 relative to the object figure 220. In the example described, an overshooting of the threshold value can also lead to a generation of the action instruction for the industrial robot 110 in the real space, in the same way as the above undershooting of the threshold value.

The virtual light barrier shown in FIG. 7 can also be implemented dynamically. In this context it is also conceivable to arrange a plurality of virtual light barriers in the figure space 260 in the form of a network or a two-dimensional surface, wherein the same principle which can cause the triggering of an action instruction for the industrial robot 110 in the real space can be applied as in the case of a single virtual light barrier.

Figure 8:
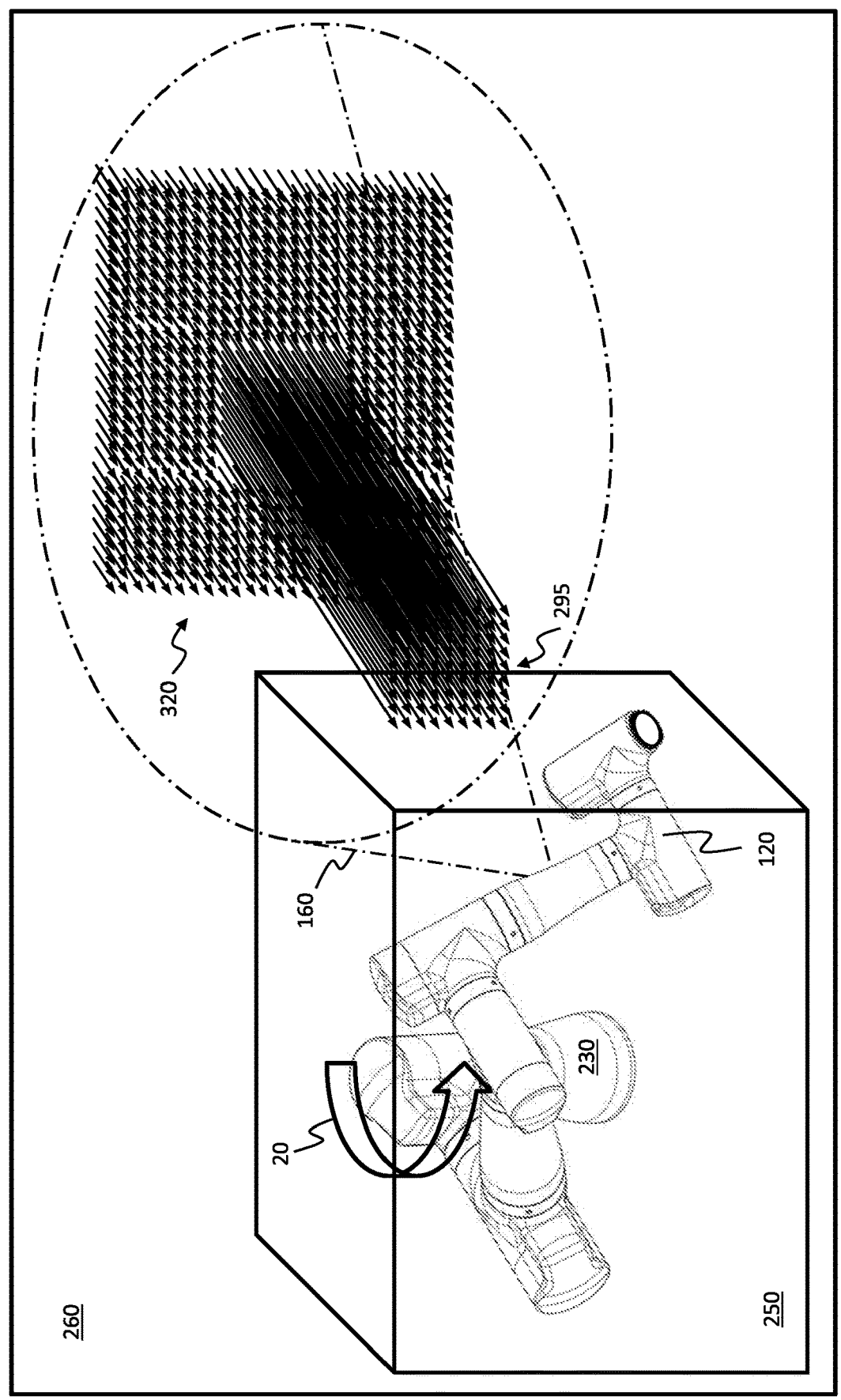
FIG. 8 a representation of a geometric control body and a vector field.

FIG. 8 shows an illustration of a vector field 320 in the figure space 260. For example, the control unit 140 can represent the object figure 220 in the form of the vector field 320, comprising a plurality of direction vectors, in the figure space 260. In doing so, the direction vectors can each have a length that may depend on the movement of the object figure 220 in the figure space 260 and be taken into account in this context by the control unit 140. Also, the length of the direction vectors can depend on the relative velocity of the object figure 220 in relation to the control figure 230 or the simplified geometric control body 250, and/or on other constraints. The control unit 140 can be calculated by taking the partial derivative with respect to time of the points of the object 170 captured with the environment detection unit 120 of the industrial robot 110 in the environment of the industrial robot 110, for example, the direction vectors (relative velocity). In this way, the control unit 140 can predict a time of a possible imminent collision.

For example, the geometric control body 250, which can form a simplified version of the control figure 230 in the figure space 260, can move in the second movement direction 20 in FIG. 8. It is also apparent in FIG. 8 that the geometric control body 250 can intersect the vector field 320 which represents the object figure 220 in an intersection pattern 295, which can be formed in accordance with the above description. Thus, one or more direction vectors of the vector field 320 can intersect the geometric control body 250 in the intersection pattern 295 which is implemented, for example, as a point of intersection, so that the control unit 140 for the industrial robot 110 in the real space can generate one or a combination of the above action instructions in order that no collision with the object 170 can occur in the real space.

As an alternative to the representation of the object figure 220 in the form of the vector field 320 it is also possible to represent the control figure 230 or the geometric control body 250 as a vector field having a plurality of direction vectors. The direction vectors that represent the control figure 230 or the geometric control body 250 can also have a length that is dependent on the movement of the control figure 230 or the geometric control body 250. Similarly, the length of the direction vectors can also depend on other constraints, as has been explained above in relation to the object figure 220.

In addition, both for a representative display of the object figure 220 and of the control figure 230 or the geometric control body 250 in the form of the vector field 320, it is conceivable for the multiple direction vectors of the vector field 320 to be modifiable by the control unit 140 using constraints or parameters, and/or for the control unit 140 to be designed to append geometric bodies to the direction vectors in the figure space 260.

Moreover, it is conceivable for the control unit 140 to display the object 170 in the real space in its entirety, i.e. in full detail in the figure space 260 as object figure 220. For example, the control unit 140 can display the object figure 220 in the figure space 260 in a speed-dependent way and/or in a distorted form as a function of a change in an alternative constraint.

Most of the known systems which allow a collaboration with an industrial robot, do not capture the tool holders, tools, grippers, workpieces etc. (hereafter referred to as objects). On the one hand this is not required, since these systems work by monitoring torques. On the other hand, these systems cannot capture objects, with the exception of weight. The proposed industrial robot system 100 can incorporate objects in the real space directly into the representation of the control figure 230 of the industrial robot 110 in the figure space 260 and allow for them in the computation of impending collisions. The control unit 140 thus extends the control figure 230 of the industrial robot 110 or geometric control body 250 to include the dimension of the object that the industrial robot 110 can transport in the real space.

The industrial robot 110 can work, for example, in a free mode in order to measure the dimensions of the object to be transported, in other words, the industrial robot 110 acquires the dimensions of the object itself, since the object, for example, is an object unknown to the industrial robot 110. The measurement of the object to be transported can be carried out using the environment detection unit 120 of the industrial robot 110. To do so, the industrial robot takes hold of the object and directs it towards its environment detection units 120, for example in the form of one and/or more TOF cameras and/or LIDAR systems. Then the industrial robot 110 can rotate the object in front of the selected camera or LIDAR system. The control unit 140 combines the recorded images such that a 3D image of the object is produced, and augments the industrial robot in the figure space 260 to include the dimensions of the object.

In addition, it is also conceivable to measure the object to be transported by the industrial robot 110 using an external system, such as an external environment detection unit in the form of one and/or more TOF cameras and/or a LIDAR system. The 3D image obtained is again transformed into the figure space 260 by the control unit 140 and the control figure 230 of the industrial robot 110 is thereby extended.

In addition, the industrial robot 110 can operate in a safety mode, which means the industrial robot 110 can transport an object whose dimensions are known. In the case of a six-axis industrial robot 110 the object to be transported can form the seventh axis of the industrial robot 110, which is incorporated into the calculations. The control unit 140 can also continue the calculations required for displaying the object and the control figure 230 or the geometric control body 250 in the figure space 260 and for computing the time of a possible collision with the complete seventh axis, even if a part of the object that can form the seventh axis of the industrial robot 110 has been broken off, for example.

Each object that the industrial robot 110 can carry may be sensitive in different ways or have dangerous areas. One example is a knife which is being transported by an industrial robot 110. In the figure space 260 the blade and the tip can be displayed by the control unit 140 on a larger scale, so that an imminent collision in these areas is quickly detected. The industrial robot system 100 can thus be made more sensitive in these areas, which means the sensitivity of the system can thus be improved.

If the industrial robot system 100 comprises a plurality of industrial robots 110 which are provided with the above-mentioned detection units, their recorded data can be combined in a common model and, for example, evaluated by a central control unit 140. In this way, not only can protection zones 330 be displayed in the figure space 260, but shaded areas caused by the individual detection units and positions of the various industrial robot 110 can be eliminated.

In order to reduce the number of sensors and/or detection units of the industrial robot system, the industrial robot 110 can, for example, only move in the movement direction that has been captured by the sensor devices and/or the detection units. If the industrial robot 110 tries to move into a non-captured region, the industrial robot 110 can, for example, first align itself towards this region and capture the region with the sensor devices and/or the detection units before subsequently moving into the region. A simple analogous example of this is a person who first turns around and only then moves in this direction. In this case, the sensors and/or detection units for such an approach do not need to be installed exclusively in the area of an end-effector of the industrial robot 110, wherein the end-effector can be the final element of a kinematic chain, for example, a unit for welding car bodies, or more generally a gripper. It is possible to arrange the sensors and/or the detection units optimally depending on the configuration of the industrial robot 110. Even mobile sensors and/or mobile detection units can be used here, for example an environment detection unit module comprising TOF cameras or a LIDAR system, wherein the module can change the orientation and therefore the field of view 160 independently of the industrial robot.

One possibility for increasing the resolution of the environment detection unit 120 in the form of one and/or more TOF cameras and/or a LIDAR system can be to combine the environment detection unit 120 with an ordinary camera. In this case contours can be advantageously detected by the control unit 140, since an ordinary camera can provide color information, while a TOF camera and a LIDAR system can only supply the depth information for each pixel. The control unit 140 can be designed to analyze the color information using common image processing methods. The resulting data can then be merged with the depth information data from the TOF camera and/or the LIDAR system, in the control unit 140. If the control unit 140 can detect a contour using, for example, one of the above algorithms or a filtering rule, the control unit 140 can combine the depth information in this region to form a cluster.

It is also conceivable to extend the industrial robot system 100 described here to include the functions of artificial or self-learning systems. For example, the object recognition can be carried out using a neural network. Also, the process of deciding which action should be initiated as a result of an imminent collision can thus be completed with self-learning techniques.

A further possibility, for the purpose of widening the field of view 160 and the range that can be captured with the sensor devices and/or the environment detection unit 120 implemented as a time-of-flight camera or LIDAR system, is to arrange a plurality of sensor chips on the industrial robot 110 according to a specific geometry and to place a common optical lens in front of the arrangement. In this way, a time-of-flight camera and/or a LIDAR system with an enlarged field of view 160 and an enlarged capture range can be implemented for the industrial robot system 100.

In addition, it would also be possible to deploy the environment detection unit 120 as a time-of-flight camera or a LIDAR system which can only provide distance information, for example. In other words, the industrial robot system 100 can omit the determination of the velocity and/or acceleration of the industrial robot 110 or the object 170 in the environment of the industrial robot 110, and the control unit 140 can evaluate only distance information in the figure space 260. Alternatively, the distance information can also be evaluated using a cloud service, wherein the cloud service is accessible through web browsers and enables services such as the evaluation of the distance information using computing power, storage space and application software provided over the internet.

To comply with increased safety requirements, it is conceivable for all environment detection units 120 and/or position detection units 130 and/or all other sensor devices to be designed redundantly in the industrial robot system 100. Also, a redundant operation can be provided so that depth as well as image information can be compared by the control unit 140, and incorrect information can thus be detected. In particular, the control unit 140 can generate an action instruction for the industrial robot 110 if the data of the TOF cameras and LIDAR systems or other sensors captured in the redundant mode are not consistent with the same field of view 160, i.e. do not match.

Another option for building a redundant industrial robot system 100 can be achieved, for example, using the deflection of light onto two environment detection units 120, thus, for example, two TOF cameras. Using an optical system the same image section can be directed to two TOF cameras, similar to a binocular attachment for a telescope or microscope which allows observation with two eyes, in order to increase the reliability of the industrial robot system 100.

It is also conceivable to provide an ability to detect a fault in the industrial robot system 100 if a known object 170 in the environment of the industrial robot 110, whose position and dimensions are known or can be determined by the environment detection unit 120 or the position detection unit 130, can no longer be recognized by the control unit 140 as the known object 170 in a subsequent acquisition of environment data of the object 170 by the environment detection unit 120 or the position detection unit 130. Even in such a case the control unit 140 can generate one of the above-mentioned instructions and, for example, shut down the industrial robot 110.

In addition, it is also conceivable to use safety-designed TOF cameras or LIDAR systems for increased safety requirements. These can detect internal faults and faults in the industrial robot system 100 themselves, and by interaction with the control unit 140 can effect a shutdown of the industrial robot 110 or an alternative action instruction for the industrial robot 110.

The invention has been described in detail by exemplary embodiments. Instead of the described exemplary embodiments, other exemplary embodiments are conceivable, which can comprise further modifications or combinations of described features. For this reason, the invention is not limited by the disclosed examples since a person skilled in the art can derive other variations therefrom, without having to depart from the scope of protection of the invention.

The advantageous designs and extensions described above and/or reproduced in the subclaims can be applied individually or else in any combination with each other—except, for example, in cases of clear dependencies or incompatible alternatives.

The invention claimed is:

1. A method for controlling a physical industrial robot in an automation system, comprising:
   detecting position data of the industrial robot,
   detecting environment data from a physical object in an environment of the industrial robot,
   transforming the position data of the industrial robot and the environment data of the object in the environment of the industrial robot into a common figure space in which a control figure is defined for the industrial robot and an object figure of the object in the environment of the industrial robot is represented,
   wherein the control figure is a selected virtual representation of the physical industrial robot and the object figure is a selected virtual representation of the physical object in the environment of the physical industrial robot, wherein said selected virtual representations comprise a modified scaling of the control figure and/or object figure, and/or a reduction of the control figure and/or the object figure to geometric shapes in the figure space, respectively, and
   during a movement of the control figure for the industrial robot and/or during a movement of the object figure of the object in the environment of the industrial robot in the figure space, representing the control figure for the industrial robot and/or the object figure of the object in the environment of the industrial robot in the figure space scaled with a higher degree of detail,
   wherein the higher degree of detail reflects dynamics of the control figure and/or dynamics of the object figure;
   creating a parameter set, which takes into account a dimensioning of the control figure and the object figure in the figure space,
   wherein the parameter set comprises a temporal and spatial correlation of the position data of the industrial robot and the environment data of the object in the environment of the industrial robot, and takes into account a movement history of the industrial robot and/or of the object in the environment of the industrial robot, and generating an action instruction for the industrial robot in the real space in order that no collision with the object can occur in the real space if the control figure and the object figure in the figure space satisfy a predefined criterion in relation to each other, depending on the selected virtual representations of the control figure and object figure.

2. The method as claimed in claim 1, further comprising: determining, for the predefined criterion for the control figure and the object figure in the figure space, an intersection pattern of the control figure for the industrial robot and of the object figure of the object in the environment of the industrial robot, and/or determining, for the predefined criterion for the control figure and the object figure in the figure space, an intersection pattern of the control figure and the object figure of the object in the environment of the industrial robot on an entire planned trajectory of the control figure of the industrial robot, and/or determining, for the specified criterion for the control figure and the object figure in the figure space, an undershooting of a threshold or an overshooting of the threshold of the control figure of the industrial robot and/or the object figure of the object in the environment of the industrial robot.

3. The method as claimed in claim 2, further comprising determining the planned trajectory of the control figure of the industrial robot and representing the planned trajectory in the figure space as a polygonal chain or as a mathematical function.

4. The method as claimed in claim 1, further comprising: representing a prescribed distance between a position of the object figure of the object in the environment of the industrial robot and the position of the control figure for the industrial robot in the figure space, wherein the prescribed distance forms the threshold value, and continuously determining a measured distance between the position of the object figure and the position of the control figure in the figure space, wherein the threshold value is undershot if said measuring distance contains a lower value than the threshold value.

5. The method as claimed in claim 1, further comprising: for dimensioning the control figure for the industrial robot and/or for dimensioning the object figure of the object in the environment of the industrial robot, taking the movement history of the industrial robot into account by a velocity and/or acceleration of the industrial robot being determined from the position data of the industrial robot, and/or taking the movement history of the object in the environment of the industrial robot into account by a velocity and/or acceleration of the object being determined from the environment data of the object in the environment of the industrial robot.

6. The method as claimed in claim 1, further comprising: representing the control figure for the industrial robot in the figure space in simplified form as a geometric control body, and/or representing the object figure of the object in the environment of the industrial robot in the figure space in simplified form as a geometric object body.

7. The method as claimed in claim 1, further comprising: representing the object figure of the object in the environment of the industrial robot and/or the control figure of the industrial robot in the figure space as a direction vector, wherein the direction vector has a length which is dependent on the movement of the object figure of the object in the environment of the industrial robot and/or on the movement of the control figure of the industrial robot.

8. The method as claimed in claim 1, wherein the control figure for the industrial robot in the figure space is extensible to include an object, and for this purpose, extending the control figure of the industrial robot in the figure space by a dimension of the object.

9. The method as claimed in claim 1, further comprising: representing the environment data of the object in the environment of the industrial robot as a point in the figure space, wherein a point cloud in the figure space has a plurality of points comprising distance information from the object in the environment of the industrial robot, and filtering the points of the point cloud according to a filtering rule and creating the object figure of the object in the environment of the industrial robot from said filtering.

10. The method as claimed in claim 1, wherein the action instruction for the industrial robot comprises the following actions:

slowing down the movement of the industrial robot;

restriction of the industrial robot to a given moment, which is provided by at least one motor of the industrial robot;

switching off the industrial robot;

movement of the industrial robot out of a task space in which the industrial robot performs specified tasks when the object in the environment of the industrial robot is located in the task space and transferring the industrial robot into a waiting position, movement of the industrial robot back into the task space if the object in the environment of the industrial robot has left the task space, or movement of the industrial robot on an alternative trajectory when the object in the environment of the industrial robot is moving on the planned trajectory of the industrial robot, and wherein the alternative trajectory for the industrial robot can be specified or is determined dynamically in the figure space.

11. An automated industrial robot system, having a physical industrial robot and a control unit, the control unit configured to carry out the method as claimed in claim 1.

12. A detection system comprising a control unit configured to carry out the method for controlling a physical industrial robot in an automation system as claimed in claim 1, and including:

an environment detection unit, the environment detection unit comprising at least one of a LIDAR system, a TOF camera, a scanning system and a monitoring system, and a position detection unit, the position detection unit comprising at least one of a LIDAR system, a TOF camera, positioning system, a localization system, a scanning system and a monitoring system, wherein the position detection unit is configured to detect the position data of the industrial robot, and wherein the environment detection unit is configured to detect the environment data from the physical object in the environment of the industrial robot.

13. A method for controlling a physical industrial robot in an automation system, comprising:
   detecting position data of the industrial robot;
   detecting environment data from a physical object in an environment of the industrial robot;
   transforming the position data of the industrial robot and the environment data of the object in the environment of the industrial robot into a common figure space in which a control figure is defined for the industrial robot and an object figure of the object in the environment of the industrial robot is represented,
   wherein the control figure is a selected virtual representation of the physical industrial robot and the object figure is a selected virtual representation of the physical object in the environment of the physical industrial robot, wherein said selected virtual representations comprise a modified scaling of the control figure and/or object figure, and/or a reduction of the control figure and/or the object figure to geometric shapes in the figure space, respectively; and
   during a movement of the control figure for the industrial robot and/or during a movement of the object figure of the object in the environment of the industrial robot in the figure space, representing the control figure for the industrial robot and/or the object figure of the object in the environment of the industrial robot in the figure space on an enlarged scale and with a higher degree of detail, wherein the higher degree of detail reflects dynamics of the control figure and/or dynamics of the object figure,
   wherein the enlarged scale takes into account the dynamics of the control figure and/or dynamics of the object figure, wherein the enlarged scale is based on a velocity and/or acceleration of the industrial robot and/or the object in real space;
   creating a parameter set, which takes into account a dimensioning of the control figure and the object figure in the figure space,
   wherein the parameter set comprises a temporal and spatial correlation of the position data of the industrial robot and the environment data of the object in the environment of the industrial robot, and takes into account a movement history of the industrial robot and/or of the object in the environment of the industrial robot; and
   generating an action instruction for the industrial robot in the real space in order that no collision with the object can occur in the real space if the control figure and the object figure in the figure space satisfy a predefined criterion in relation to each other, depending on the selected virtual representations of the control figure and object figure.

14. The method as claimed in claim 13, further comprising:
   determining, for the predefined criterion for the control figure and the object figure in the figure space, an intersection pattern of the control figure for the industrial robot and of the object figure of the object in the environment of the industrial robot, and/or
   determining, for the predefined criterion for the control figure and the object figure in the figure space, an intersection pattern of the control figure and the object figure of the object in the environment of the industrial robot on an entire planned trajectory of the control figure of the industrial robot, and/or
   determining, for the specified criterion for the control figure and the object figure in the figure space, an undershooting of a threshold or an overshooting of the threshold of the control figure of the industrial robot and/or the object figure of the object in the environment of the industrial robot.

15. The method as claimed in claim 14, further comprising determining the planned trajectory of the control figure of the industrial robot and representing the planned trajectory in the figure space as a polygonal chain or as a mathematical function.

16. The method as claimed in claim 13, further comprising:
   representing a prescribed distance between a position of the object figure of the object in the environment of the industrial robot and the position of the control figure for the industrial robot in the figure space, wherein the prescribed distance forms the threshold value, and
   continuously determining a measured distance between the position of the object figure and the position of the control figure in the figure space,
   wherein the threshold value is undershot if said measuring distance contains a lower value than the threshold value.

17. The method as claimed in claim 13, further comprising:
   for dimensioning the control figure for the industrial robot and/or for dimensioning the object figure of the object in the environment of the industrial robot, taking the movement history of the industrial robot into account by a velocity and/or acceleration of the industrial robot being determined from the position data of the industrial robot, and/or
   taking the movement history of the object in the environment of the industrial robot into account by a velocity and/or acceleration of the object being determined from the environment data of the object in the environment of the industrial robot.

18. The method as claimed in claim 13, further comprising:
   representing the control figure for the industrial robot in the figure space in simplified form as a geometric control body, and/or
   representing the object figure of the object in the environment of the industrial robot in the figure space in simplified form as a geometric object body.

19. The method as claimed in claim 13, further comprising:
   representing the object figure of the object in the environment of the industrial robot and/or the control figure of the industrial robot in the figure space as a direction vector,
   wherein the direction vector has a length which is dependent on the movement of the object figure of the object in the environment of the industrial robot and/or on the movement of the control figure of the industrial robot.

20. The method as claimed in claim 13,
   wherein the control figure for the industrial robot in the figure space is extensible to include an object, and
   extending the control figure of the industrial robot in the figure space by a dimension of the object.

21. The method as claimed in claim 13, further comprising:

representing the environment data of the object in the environment of the industrial robot as a point in the figure space, wherein a point cloud in the figure space has a plurality of points comprising distance information from the object in the environment of the industrial robot, and filtering the points of the point cloud according to a filtering rule and creating the object figure of the object in the environment of the industrial robot from said filtering.

22. The method as claimed in claim 13, wherein the action instruction for the industrial robot comprises the following actions:

slowing down the movement of the industrial robot;

restriction of the industrial robot to a given moment, which is provided by at least one motor of the industrial robot;

switching off the industrial robot;

movement of the industrial robot out of a task space in which the industrial robot performs specified tasks when the object in the environment of the industrial robot is located in the task space and transferring the industrial robot into a waiting position, movement of the industrial robot back into the task space if the object in the environment of the industrial robot has left the task space, or movement of the industrial robot on an alternative trajectory when the object in the environment of the industrial robot is moving on the planned trajectory of the industrial robot, and wherein the alternative trajectory for the industrial robot is dynamically specifiable or determinable in the figure space.

23. An automated industrial robot system having a physical industrial robot and a control unit, the control unit configured to carry out the method as claimed in claim 13.

24. A detection system comprising a control unit configured to carry out the method for controlling a physical industrial robot in an automation system as claimed in claim 13, and including:

an environment detection unit, the environment detection unit comprising at least one of a LIDAR system, a TOF camera, a scanning system and a monitoring system, and a position detection unit, the position detection unit comprising at least any of a LIDAR system, a TOF camera, positioning system, a localization system, a scanning system and a monitoring system, wherein the position detection unit is configured to detect the position data of the industrial robot, and wherein the environment detection unit is configured to detect the environment data from the physical object in the environment of the industrial robot.

* * * * *